(12) United States Patent
Suenaga et al.

(10) Patent No.: US 8,217,323 B2
(45) Date of Patent: Jul. 10, 2012

(54) HIGH-FREQUENCY HEATING DEVICE

(75) Inventors: Haruo Suenaga, Osaka (JP); Hideaki Moriya, Nara (JP); Shinichi Sakai, Nara (JP); Hisashi Morikawa, Nara (JP); Toyotsugu Matsukura, Nara (JP); Nobuo Shirokawa, Nara (JP)

(73) Assignee: Panasonic Corporation, Osaka (JP)

( * ) Notice: Subject to any disclaimer, the term of this patent is extended or adjusted under 35 U.S.C. 154(b) by 806 days.

(21) Appl. No.: 10/599,431

(22) PCT Filed: Apr. 4, 2005

(86) PCT No.: PCT/JP2005/006606
§ 371 (c)(1),
(2), (4) Date: Apr. 2, 2007

(87) PCT Pub. No.: WO2005/099309
PCT Pub. Date: Oct. 20, 2005

(65) Prior Publication Data
US 2007/0195561 A1    Aug. 23, 2007

(30) Foreign Application Priority Data
Apr. 7, 2004  (JP) ................................ 2004-113272

(51) Int. Cl.
*H05B 6/66* (2006.01)
(52) U.S. Cl. ..................................... 219/715; 363/21.02
(58) Field of Classification Search .................. 219/715, 219/678, 721
See application file for complete search history.

(56) References Cited

U.S. PATENT DOCUMENTS

| | | | | |
|---|---|---|---|---|
| 5,274,208 A | * | 12/1993 | Noda | 219/715 |
| 6,362,463 B1 | * | 3/2002 | Bessyo et al. | 219/715 |
| 2005/0174819 A1 | * | 8/2005 | Yang | 363/127 |

FOREIGN PATENT DOCUMENTS

| | | | |
|---|---|---|---|
| EP | 0 517 226 A1 | | 12/1992 |
| JP | 61 211987 A | | 9/1986 |
| JP | 62-066595 | * | 3/1987 |
| JP | 62-66595 | * | 3/1987 |
| JP | 6266595 | | 3/1987 |

(Continued)

OTHER PUBLICATIONS

European Search Report for EP05728854 (corresponding European application of U.S. Appl. No. 10/599,431) dated Jun. 4, 2009.

*Primary Examiner* — Tu B Hoang
*Assistant Examiner* — Thien S Tran
(74) *Attorney, Agent, or Firm* — Pearne & Gordon LLP

(57) ABSTRACT

An object of the present invention is to provide an inverter circuit in which soft start can be implemented by a simple circuit added thereto. In high-frequency heating apparatus for driving a magnetron, a DC power supply is chopped by two semiconductor switching devices, and this is output as an AC current through a resonance circuit. The high-frequency heating apparatus includes a dead time generation circuit for turning off the semiconductor switching devices concurrently. In the high-frequency heating apparatus, a drive unit for driving the aforementioned semiconductor switching devices has a function of limiting the lowest frequency of a frequency with which the semiconductor switching devices are driven. The aforementioned lowest frequency is set to be high at the beginning of operation of the high-frequency heating apparatus, and the aforementioned lowest frequency is set to be lower gradually thereafter.

15 Claims, 15 Drawing Sheets

FOREIGN PATENT DOCUMENTS

| | | |
|---|---|---|
| JP | 02 098490 U | 8/1990 |
| JP | 2-98690 | 8/1990 |
| JP | 298490 | 8/1990 |
| JP | 04215287 | 8/1992 |
| JP | 07045361 | 2/1995 |
| JP | 10 302958 A | 11/1998 |
| JP | 2000-58252 | 2/2000 |
| JP | 2003 077626 A | 3/2003 |
| JP | 2003115370 | 4/2003 |
| JP | 2003-257604 * | 9/2003 |
| JP | 2003-259643 * | 9/2003 |
| JP | 2004-030981 * | 1/2004 |
| JP | 2004030981 | 1/2004 |
| JP | 2004113272 | 4/2004 |
| JP | 2005-123026 | 5/2005 |
| WO | 2005/039245 A1 | 4/2005 |

* cited by examiner

FIG. 11 (a)
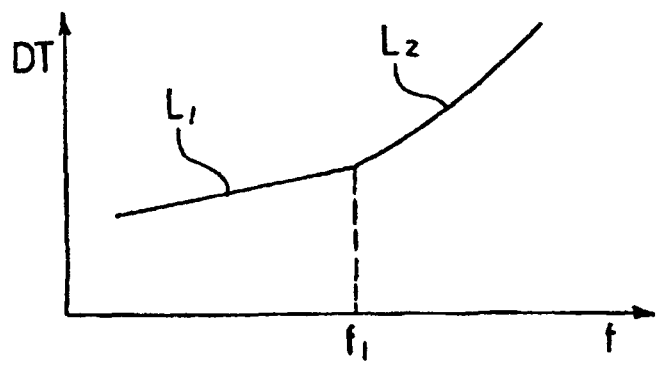
FIG. 11 (b)
(イ)
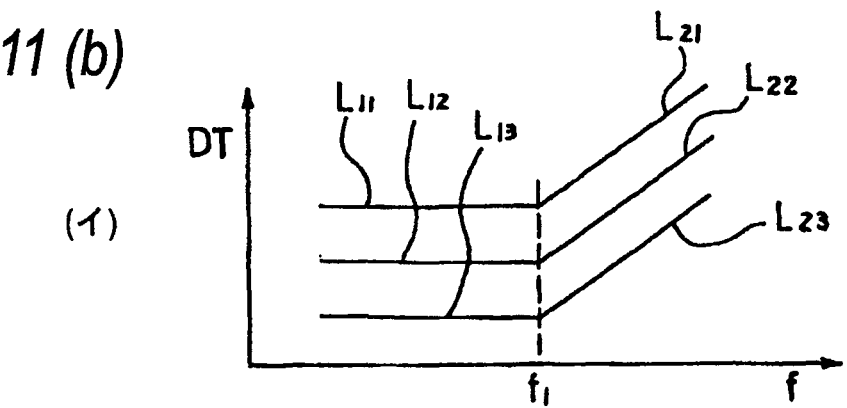
(ロ)
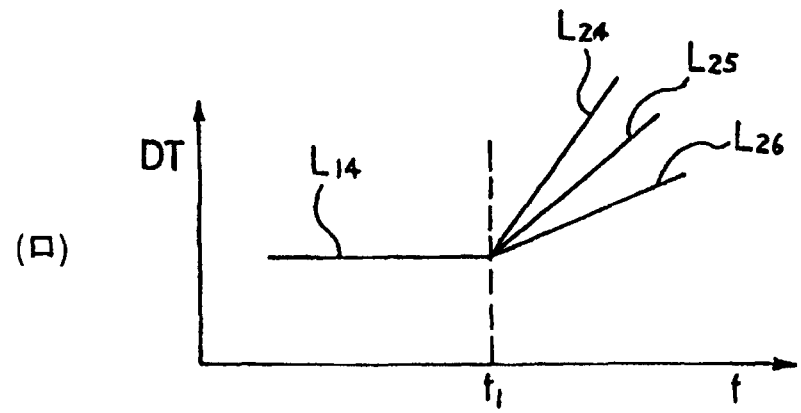
(ハ)
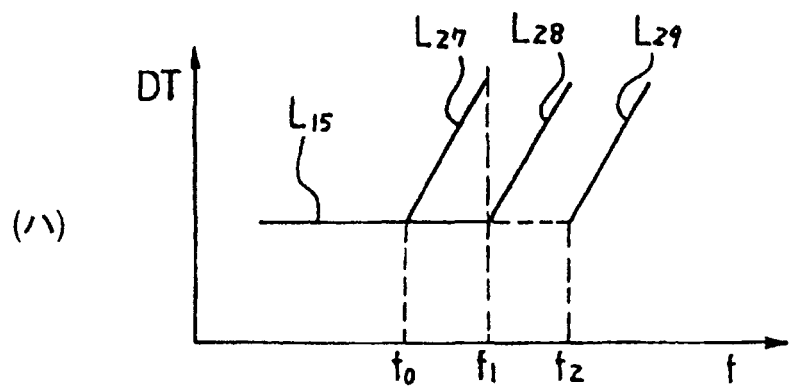

HIGH-FREQUENCY HEATING DEVICE

TECHNICAL FIELD

The present invention relates to high-frequency heating using a magnetron in a microwave oven or the like, particularly relates to an inverter circuit therefor.

BACKGROUND ART

Conventional power supplies mounted on high-frequency heating apparatus were heavy and large. It has been therefore demanded to make the power supplies smaller in size and lighter in weight. To this end, in various kinds of present fields, switching has been aggressively applied to power supplies to thereby make the power supplies smaller in size, lighter in weight and lower in price. In high-frequency heating apparatus for cooking foodstuffs by microwaves generated by magnetrons, there was a request to make power supplies for driving the magnetrons smaller in size and lighter in weight. The request was realized by switching in inverter circuits.

Of the inverter circuits, a high-frequency inverter circuit aimed at by the present invention is based on a resonance type circuit system using switching devices, in which an arm of a bridge is formed by two transistors (for example, see Patent Document 1).

Patent Document 1

Japanese Patent Laid-Open No. 2000-58252

For a one-transistor inverter (controlling on/off intervals), it is necessary to use a transistor having a collector-emitter withstand voltage of about 1,000 volts. However, in the two-transistor bridge configuration, each transistor does not have to have a high collector-emitter withstand voltage. Thus, it is sufficient that the collector-emitter withstand voltage of each transistor is about 600 V. Therefore, it is advantageous that low-price transistors can be used in the bridge configuration. In such an inverter, a resonance circuit is formed by an inductance L and a capacitance C, and the resonance circuit has a resonance characteristic having a peak at a resonance frequency f0 as shown in FIG. 1.

FIG. 1 is a diagram showing a current to working frequency characteristic when a constant voltage is applied to an inverter resonance circuit according to the present invention.

The frequency f0 is a resonance frequency of the LC resonance circuit of the inverter circuit. A current to frequency characteristic curve 11 in a frequency range f1-f3 higher than this frequency f0 is used.

A current I1 is the highest at the resonance frequency f0. The current I1 decreases as the frequency increases from f1 to f3 in the frequency range. In the frequency range f1-f3, a lower frequency is closer to the resonance frequency. Thus, the current I1 increases so that the current flowing into the secondary side of a leakage transformer increases. On the contrary, a higher frequency is farther from the resonance frequency. Thus, the current flowing into the secondary side of the leakage transformer decreases. In an inverter circuit for operating a microwave oven serving as a nonlinear load, the output is changed by changing this frequency.

In a microwave oven using a nonlinear load of a magnetron, the switching frequency is varied when a power supply to be input is an AC power supply such as a commercial power supply, as will be described later.

In any high frequency output, the frequency is the highest near a phase of 90 degrees and 270 degrees. For example, the highest frequency is near f3 when the microwave oven is used with a power of 200 W. The highest frequency is lower than f3 when the power is 500 W, and further lower when the power is 1,000 W. Not to say, due to input power or input current control, this frequency varies in accordance with a change of the commercial power supply voltage, the magnetron temperature, etc.

In addition, near 0 degree and 180 degrees in the aforementioned power supply phase, no high frequency oscillation occurs unless a high voltage is applied. In accordance with such a characteristic of the magnetron, the frequency is set near f1 close to the resonance frequency f0 where a resonance current increases. Thus, the step-up ratio of the voltage applied to the magnetron with respect to the commercial power supply is increased so that the phase width of the commercial power supply with which radio waves can be generated from the magnetron is set broadly.

FIG. 2 shows an example of resonance type high-frequency heating apparatus driven by the two-transistor bridge switching devices disclosed in Patent Document 1. In FIG. 2, the high-frequency heating apparatus is constituted by a DC power supply 1, a leakage transformer 2, a first semiconductor switching device 6, a first capacitor 4, a second capacitor 5, a third capacitor (smoothing capacitor) 13, a second semiconductor switching device 7, a drive portion 8, a full-wave voltage-doubler rectifier circuit 10, and a magnetron 11.

The DC power supply 1 full-wave rectifies the commercial power supply and applies an obtained DC voltage VDC to a series circuit of the second capacitor 5 and a primary winding 3 of the leakage transformer 2. The first semiconductor switching device 6 and the second semiconductor switching 7 are connected in series. The series circuit of the primary winding 3 of the leakage transformer 2 and the second capacitor 5 is connected in parallel to the second semiconductor switching device 7.

The first capacitor 4 is connected in parallel to the second semiconductor switching 7. A high-voltage output generated in a secondary winding 9 of the leakage transformer 2 is converted into a high DC voltage by the full-wave voltage-doubler rectifier circuit 10, and applied between the anode and the cathode of the magnetron 11. A tertiary winding 12 of the leakage transformer 2 supplies a current to the cathode of the magnetron 11.

The first semiconductor switching device 6 is constituted by an IGBT and a flywheel diode connected in parallel thereto. The second semiconductor switching device 7 is constituted by an IGBT and a diode in the same manner.

Not to say, the first and second semiconductor switching devices 6 and 7 are not limited to this type. Thyristors, GTO switching devices, etc. are also available.

The drive portion 8 is internally provided with an oscillation portion for generating a driving signal for the first semiconductor switching device 6 and the second semiconductor switching device 7. A signal with a predetermined frequency and a predetermined duty is generated by this oscillation portion and given as a driving signal to the first semiconductor switching device 6.

The first and second semiconductor switching devices 6 and 7 are driven alternately or at an interval of dead time in which both the first and second semiconductor switching devices 6 and 7 are off. The dead time is provided by a dead time generating unit which will be described later. Immediately after one of the first and second semiconductor switching devices 6 and 7 is turned off, the end-to-end voltage of the other semiconductor switching device is high. When the other semiconductor switching device is turned on in this event, a spike-like overcurrent flows so that unnecessary loss and noise occur. When the dead time is provided, the tuning-on is delayed till this end-to-end voltage decreases to about 0 V. Thus, the aforementioned loss and noise are prevented. Not to say, similar operation is also performed when the switching is reversed.

FIG. 3 shows modes in which the circuit in FIG. 2 operates, respectively.

In addition, FIG. 4 shows voltage-current waveform charts of parts such as semiconductor switching devices etc. in the circuit.

In the drawings, (a) in Mode 1, a driving signal is given to the first semiconductor switching device 6. In this event, a current from the DC power supply 1 flows through the primary winding 3 of the leakage transformer 2 and the second capacitor 5.

(b) In Mode 2, the first semiconductor switching device 6 is turned off, and the current having flowed through the primary winding 3 and the second capacitor 5 begins to flow toward the first capacitor 4 while the voltage of the first semiconductor switching device 6 increases concurrently.

(c) In Mode 3, the voltage of the first capacitor 4 moves from VDC to 0 V. In Mode 3, the end-to-end voltage of the first capacitor 4 reaches 0 V, and the diode constituting the second switching device 7 is turned on.

(d) In Mode 4, the direction of the current having flowed through the primary winding 3 and the second capacitor 5 is inverted by resonance. Therefore, the second semiconductor switching device 7 has to be on until this event. In the period of Modes 2, 3 and 4, the voltage of the first semiconductor switching device 6 becomes equal to the DC power supply voltage VDC. In a zone such as Europe where the commercial power supply voltage is 230 V in effective value, the voltage peak reaches $\sqrt{2}$ times. Accordingly, the DC power supply voltage VDC is about 325 V.

(e) In Mode 5, the second semiconductor switching device 7 is turned off, and the current having flowed through the second capacitor 5 and the primary winding 3 begins to flow toward the first capacitor 4 so that the voltage of the first capacitor 4 increases to VDC.

(f) In Mode 6, the voltage of the first capacitor 4 reaches VDC so that the diode constituting the first semiconductor switching device 6 is turned on. The direction of the current having flowed through the primary winding 3 and the second capacitor 5 is inverted by resonance. The first semiconductor switching device 5 has to be on until this event. This leads to Mode 1. In the period of Modes 6 and 1, the voltage of the second semiconductor switching device 7 becomes equal to the DC power supply voltage VDC.

According to this circuit configuration, the peak value of the voltage to be applied to the first semiconductor switching device 6 and the second semiconductor switching device 7 can be made equal to the DC power supply voltage VDC.

Mode 2 and Mode 5 are resonance periods in which the current from the primary winding 3 flows into the first capacitor 4 and the second capacitor 5. Since the capacitance value of the first capacitor 4 is set to be not higher than 1/10 of the capacitance value of the second capacitor 5, the combined capacitance is substantially close to the capacitance value of the first capacitance 4. The voltage to be applied to the first semiconductor switching device 6 and the second semiconductor switching device 7 in Modes 3 and 5 is changed by a time constant depending on this combined capacitance and the impedance of the leakage transformer 3. Since this voltage change has an inclination depending on the aforementioned time constant, the switching loss when the first semiconductor switching device is off in Mode 3 is relieved.

Further, the voltage reaches zero in Mode 5. Accordingly, the switching loss when the first semiconductor switching device is turned on is relieved because the voltage applied to the first semiconductor switching device is zero when the first semiconductor switching device is turned on in Mode 1. This is referred to as zero-voltage switching. The resonance circuit system is characterized by these. This system makes the most use of this characteristic, and there is an advantage that the voltage of each semiconductor switching device is prevented from being higher than the DC power supply voltage VDC. The second capacitor 5 is set to have a capacitance value large enough to suppress the ripple of the voltage thereof, as shown in FIG. 4.

As shown in FIG. 2, in the inverter circuit in which the series-connected circuit of the semiconductor switching devices 6 and 7 is connected in parallel to the DC power supply 1 so as to form an arm out of two transistors, the semiconductor switching devices 6 and 7 are turned on/off alternately and repeatedly so as to generate a high-frequency alternating current in the primary winding 3 of the leakage transformer 2 and induce a high voltage and a high frequency in the secondary winding 9 thereof. Any period when the semiconductor switching devices 6 and 7 are on concurrently cannot be accepted even if it is a second. This is because short-circuit of the DC power supply 1 occurs in such a period.

Therefore, in the background art, a period (dead time, abbreviated to DT) when neither the semiconductor switching device 6 nor the semiconductor switching device 7 is on is always provided after one of the semiconductor switching devices 6 and 7 is turned off and before the other semiconductor switching device is turned on.

Therefore, the dead time DT will be described with reference to FIG. 4.

FIG. 4 shows voltage and current waveforms of the first and second semiconductor switching devices 6 and 7 (FIG. 2) and the first and second capacitors 4 and 5 in the aforementioned Modes 1 to 6.

(a) of FIG. 4 shows the current waveform of the first semiconductor switching device 6 in the aforementioned Modes 1 to 6, in which the semiconductor switching device 6 which has been on since a time t0 (therefore, the emitter-collector voltage of the semiconductor switching device 6 is zero in (b) of FIG. 4) is turned off (the current thereto becomes zero) at a time 1 when Mode 1 is terminated.

On the other hand, (d) of FIG. 4 shows the current waveform of the second semiconductor switching device 7, in which the second semiconductor switching device 7 having been off since the time to is kept off until a time t2 when an on signal is applied thereto and Mode 3 starts.

Accordingly, in a period DT1 between the time t1 and the time t2, both the first semiconductor switching device 6 and the second semiconductor switching device 7 are off.

This period DT1 corresponds to the minimum value demanded from the dead time. The maximum value is a period between the time t1 and a time t3. The dead time is allowed within this range.

In the same manner, a period DT2 between a time t4 when the second semiconductor switching device 7 is turned off (the current thereto becomes zero) as shown in (c) of FIG. 4 and a time t5 when an on signal is applied to the first semiconductor switching device 6 and Mode 6 starts as shown in (a) of FIG. 4, corresponds to the minimum value. The maximum value is a period between the time t4 and a time t6. The dead time is allowed within this range.

In a two-transistor inverter circuit in the background art, the value of this dead time DT is fixed based on the periods DT1 and DT2 obtained respectively from the ranges with which turning-on and turning-off of the semiconductor switching devices 6 and 7 are not superimposed on each other.

However, in an inverter circuit of a microwave oven, when the inverter circuit is driven in a high-frequency region, the period between the time when one of semiconductor switching devices is turned off and the time when an emitter-collector voltage Vce of the other semiconductor switching device drops down to zero is increased. Accordingly, when a turn-on signal is applied to the aforementioned other semiconductor switching device after a fixed dead time has passed since the aforementioned one semiconductor switching device was turned off, the aforementioned other semiconductor switching device is turned on before the emitter-collector voltage Vce drops down to zero. When the switching frequency is high, heat loss may occur in the semiconductor switching devices, causing a failure in the semiconductor switching devices or occurrence of a spike current breeding noise.

This reason why heat loss occurs and noise occurs will be also described with reference to FIG. 4.

Though the semiconductor switching device 6 is turned off at the time t1 (the current thereto becomes zero) in (a) of FIG. 4, it takes time t1-t2 for the end-to-end voltage (solid line) of the other semiconductor switching device 7 to drop down to zero in (d) of FIG. 4. Accordingly, when a turn-on signal is applied to the other semiconductor switching device 7 at the time t2, the semiconductor switching device 7 is turned on (to establish conductivity) from a zero voltage (this is referred to as "zero volt switching") because the emitter-collector voltage of the semiconductor switching device 7 has dropped down to zero before that time. Thus, problems in heat loss and noise do not occur.

However, the inclination of the trapezoid of VDC changes in accordance with the intensity of resonance. When the resonance is intensive (the frequency is low), the inclination is so sharp that the end-to-end voltage of the semiconductor switching device 7 reaches zero quickly. When the resonance is weak (the frequency is high), the inclination is so gentle that it takes more time for the end-to-end voltage to drop down to zero volt. When the inverter circuit is driven at such a high-frequency region, the frequency is far from the resonance frequency so that the time constant becomes long. Therefore, the time for the end-to-end voltage (illustrated by the broken line) of the other semiconductor switching device 7 to drop down to zero is elongated in (d) of FIG. 4 so that the voltage cannot drop down perfectly in the time t1-t2. Thus, a predetermined voltage (see Vt2 designated by the broken line F) is applied even after the time t2.

Accordingly, when an on signal is applied to the semiconductor switching device 7 at the time t2 as usual, the semiconductor switching device 7 is turned on with the predetermined voltage Vt2 applied between the emitter and the collector of the semiconductor switching device 7. Thus, heat loss occurs. In addition, a steep spike current flows due to the occurrence of a large value dv/dt so as to breed noise.

Even when such hard switching (switching performed forcibly though the voltage or the current is not zero) is performed, the dead time is secured. Thus, the hard switching does not lead to any failure such as short-circuit of the power supply, but surplus heat loss merely occurs in the IGBT. Such heat loss is cooled by a heat sink. Even when the heat loss occurs, the inverter operation can be maintained normally. Noise due to the spike current is not a value which should be treated as a serious problem. Therefore, in the background-art inverter circuit, the adverse effect of hard switching has been unchallenged at all. Thus, there has been considered an inverter circuit in which a dead time DT having been fixed in the background art is varied to save useless energy consumption, no adverse effect is given to the lives of semiconductor switching devices, and noise hardly occur.

DISCLOSURE OF THE INVENTION

Problems that the Invention is to Solve

It is therefore an object of the present invention to apply soft start not only to high-frequency heating apparatus of a type in which a dead time DT is fixed but also to high-frequency heating apparatus of a type in which a dead time DT is made variable in accordance with frequency, and to provide high-frequency heating apparatus in which the soft start can be implemented easily by an extremely simple circuit added thereto.

Means for Solving the Problems

In order to solve the foregoing problems, the invention of high-frequency heating apparatus according to Claim 1 is high-frequency heating apparatus for driving a magnetron, including: a DC power supply comprised of an AC power supply, a rectifier circuit for rectifying a voltage of the AC power supply, and a smoothing capacitor for smoothing an output voltage of the rectifier circuit; a series circuit comprised of two semiconductor switching devices, the aforementioned series circuit being connected in parallel to the aforementioned AC power supply; a resonance circuit connected to a primary winding of a leakage transformer and a capacitor, one end of the aforementioned resonance circuit being connected to a middle point of the aforementioned series circuit in an AC equivalent circuit while the other end of the resonance circuit is connected to one end of the aforementioned AC power supply; a drive unit for driving each of the aforementioned semiconductor switching devices; a rectifier unit connected to a secondary winding of the aforementioned leakage transformer; a magnetron connected to the aforementioned rectifier unit; and a dead time generation circuit for turning off the semiconductor switching devices concurrently; the high-frequency heating apparatus being characterized in that the aforementioned drive unit has a function of limiting the lowest frequency of a frequency with which the aforementioned semiconductor switching devices are driven, so that the aforementioned lowest frequency is set to be high at the beginning of operation of the high-frequency heating apparatus, and the aforementioned lowest frequency is set to be lower gradually thereafter.

The invention of high-frequency heating apparatus according to Claim 2 is high-frequency heating apparatus for driving a magnetron, including: a DC power supply comprised of an AC power supply, a rectifier circuit for rectifying a voltage of the AC power supply, and a smoothing capacitor for smoothing an output voltage of the rectifier circuit; two series circuits each comprised of two semiconductor switching devices, each of the aforementioned series circuits being connected in parallel to the aforementioned AC power supply; a resonance circuit connected to a primary winding of a leakage transformer and a capacitor, one end of the aforementioned resonance circuit being connected to a middle point of one of the aforementioned series circuits while the other end of the resonance circuit is connected to a middle point of the other series circuit; a drive unit for driving each of the aforementioned semiconductor switching devices; a rectifier unit connected to a secondary winding of the aforementioned leakage transformer; a magnetron connected to the aforementioned rectifier unit; and a dead time generation circuit for turning off the semiconductor switching devices concurrently; the high-frequency heating apparatus being characterized in that the aforementioned drive unit has a function of limiting the lowest frequency of a frequency with which the aforementioned semiconductor switching devices are driven, so that the aforementioned lowest frequency is set to be high at the beginning of operation of the high-frequency heating apparatus, and the aforementioned lowest frequency is set to be lower gradually thereafter.

The invention of high-frequency heating apparatus according to Claim 3 is high-frequency heating apparatus for driving a magnetron, including: a DC power supply comprised of an AC power supply, a rectifier circuit for rectifying a voltage of the AC power supply, and a smoothing capacitor for smoothing an output voltage of the rectifier circuit; a series circuit comprised of two semiconductor switching devices, the aforementioned series circuit being connected in parallel to the aforementioned AC power supply; a resonance circuit connected to a primary winding of a leakage transformer and a capacitor, the aforementioned resonance circuit being connected in parallel to one of the aforementioned semiconductor switching devices; a drive unit for driving each of the aforementioned semiconductor switching devices; a rectifier unit connected to a secondary winding of the aforementioned leakage transformer; a magnetron connected to the aforementioned rectifier unit; and a dead time generation circuit for turning off the semiconductor switching devices concurrently; the high-frequency heating apparatus being characterized in that the aforementioned drive unit has a function of limiting the lowest frequency of a frequency with which the aforementioned semiconductor switching devices are driven, so that the aforementioned lowest frequency is set to be high at the beginning of operation of the high-frequency heating apparatus, and the aforementioned lowest frequency is set to be lower gradually thereafter.

The invention of high-frequency heating apparatus according to Claim 4 is high-frequency heating apparatus according to any one of Claims 1 to 3, further including: an error signal generation circuit for generating an error signal from a difference between an input current of the aforementioned AC power supply and a reference current; and a frequency-modulated signal generation circuit for correcting a rectified voltage/rectified current obtained by rectifying the aforementioned AC power supply, based on an output (error signal) of the aforementioned error signal generation circuit, an output of the aforementioned frequency-modulated signal generation circuit being supplied to the aforementioned dead time generation circuit; the high-frequency heating apparatus being characterized in that a lowest frequency limiting circuit is inserted between the aforementioned frequency-modulated signal generation circuit and the aforementioned dead time generation circuit, the lowest frequency limiting circuit supplies a limited frequency to the aforementioned dead time generation circuit based on the output signal of the aforementioned frequency-modulated signal generation circuit so that a set frequency of the lowest frequency limiting circuit is set to be higher than the output of the aforementioned frequency-modulated signal generation circuit at the beginning of operation of the aforementioned high-frequency heating apparatus, and in accordance with time having passed since the beginning of operation, the aforementioned limited frequency is lowered gradually, while with lowering of the aforementioned limited frequency, a signal higher in switching frequency of the aforementioned limited frequency and the output signal of the aforementioned frequency-modulated signal generation circuit is selected as a signal to be supplied to the aforementioned dead time generation circuit in accordance with time having passed, so that the selected signal is changed over gradually to the output signal of the aforementioned frequency-modulated signal generation circuit.

The invention of high-frequency heating apparatus according to Claim 5 is high-frequency heating apparatus according to Claim 4, characterized in that the aforementioned lowest frequency limiting circuit has a capacitor, the aforementioned capacitor is charged during suspension of the aforementioned high-frequency heating apparatus, and as soon as the aforementioned high-frequency heating apparatus begins to operate, a voltage of the capacitor is supplied to the aforementioned dead time generation circuit, and charges accumulated in the capacitor are discharged.

The invention of high-frequency heating apparatus according to Claim 6 is high-frequency heating apparatus according to any one of Claims 1 to 5, characterized in that the aforementioned dead time generation circuit generates a fixed or marginally increased dead time regardless of a switching frequency.

The invention of high-frequency heating apparatus according to Claim 7 is high-frequency heating apparatus according to any one of Claims 1 to 5, characterized in that the aforementioned dead time generation circuit generates a dead time increased in accordance with increase of a switching frequency.

The invention of high-frequency heating apparatus according to Claim 8 is high-frequency heating apparatus according to Claim 7, characterized in that the aforementioned dead time generation circuit fixes or marginally increases the dead time at a switching frequency not higher than a predetermined frequency.

The invention of high-frequency heating apparatus according to Claim 9 is high-frequency heating apparatus according to Claim 7 or 8, characterized in that the aforementioned dead time generation circuit suddenly increases the dead time at a switching frequency not lower than a predetermined frequency.

The invention of high-frequency heating apparatus according to Claim 10 is high-frequency heating apparatus according to Claim 8 or 9, characterized in that a fixed or marginally increased value of the aforementioned dead time at a switching frequency not higher than a predetermined frequency or a suddenly increased value of the aforementioned dead time at a switching frequency not lower than a predetermined frequency is variable.

The invention of high-frequency heating apparatus according to Claim 11 is high-frequency heating apparatus according to any one of Claims 8 to 10, characterized in that a value of the aforementioned predetermined switching frequency is variable.

The invention of high-frequency heating apparatus according to Claim 12 is high-frequency heating apparatus according to any one of Claims 1 to 5, characterized in that the aforementioned dead time generation circuit increases the dead time stepwise with increase of a switching frequency.

The invention of high-frequency heating apparatus according to Claim 13 is high-frequency heating apparatus according to any one of Claims 1 to 12, characterized in that the aforementioned dead time generation circuit generates a dead time based on positive and negative offset voltages each varying with a first inclination in proportion to increase of a switching frequency and varying with a second inclination when the switching frequency reaches a predetermined frequency or higher.

The invention of high-frequency heating apparatus according to Claim 14 is high-frequency heating apparatus according to any one of Claims 1 to 13, characterized in that the aforementioned dead time generation circuit includes a VCC power supply, a duty control power supply, a first current varying in proportion to a switching frequency, a second current beginning to flow at a predetermined frequency and varying in proportion to the switching frequency, a third current obtaining by and multiplying a combining current of the aforementioned two currents by a predetermined coefficient, and a upper and lower potential generation unit for generating two upper and lower potentials obtained by adding positive and negative offset voltages proportional to the aforementioned third current, to the aforementioned duty control power supply respectively, and a dead time is generated based on the aforementioned two upper and lower potentials.

The invention of high-frequency heating apparatus according to Claim 15 is high-frequency heating apparatus according to Claim 14, characterized in that input power or input current control is performed by changing at least one of a voltage of the aforementioned duty control power supply and the aforementioned switching frequency.

With such a configuration, it is possible to obtain an inverter circuit in which short-circuit of a power supply is prevented from occurring, heat loss hardly occurs in IGBTs, therefore no useless energy is consumed, and noise hardly occurs, and in which soft start can be implemented by a simple circuit added thereto.

BRIEF DESCRIPTION OF THE DRAWINGS

FIG. 11 is a diagram showing the dead time-to-frequency characteristic, (a) of FIG. 11 showing an example in which a dead time DT is fixed or increased marginally when a switching frequency is not higher than a frequency f1, while the dead time DT is increased suddenly when the switching frequency is not lower than the predetermined frequency f1, (b) of FIG. 11 showing examples of modifications, (↗) of (b) of FIG. 11 showing an example in which the fixed value or marginally increased value of the dead time is made variable vertically, (⊓) of (b) of FIG. 11 showing an example in which the dead time gradient in the frequency f1 is made variable, (↗) of (b) of FIG. 11 showing an example in which a frequency serving as a point of inflection is made variable transversely.

| | |
|---|---|
| 1 | DC power supply |
| 2 | leakage transformer |
| 3 | primary winding |
| 4 | first capacitor |
| 5 | second capacitor |
| 6 | first semiconductor switching device |
| 7 | second semiconductor switching device |
| 8 | drive portion |
| 9 | secondary winding |
| 10 | full-wave voltage-doubler rectifier circuit |
| 11 | magnetron |
| 12 | tertiary winding |
| 13 | third capacitor |
| 21 | error signal generation circuit |
| 22 | frequency-modulated signal generation circuit |
| 221 | lowest frequency limiting circuit |
| 222 | capacitor |
| 221a | transistor |
| 221b, 221d, 221e | resistor |
| 221c | capacitor |
| 221f | switch |
| 221g | amplifier |
| 221h | constant voltage source |
| 23 | oscillation circuit |
| 24 | dead time generation circuit |
| 25 | rectangular wave forming circuit |
| 26 | driving circuit |

BEST MODE FOR CARRYING OUT THE INVENTION

Figure 5:
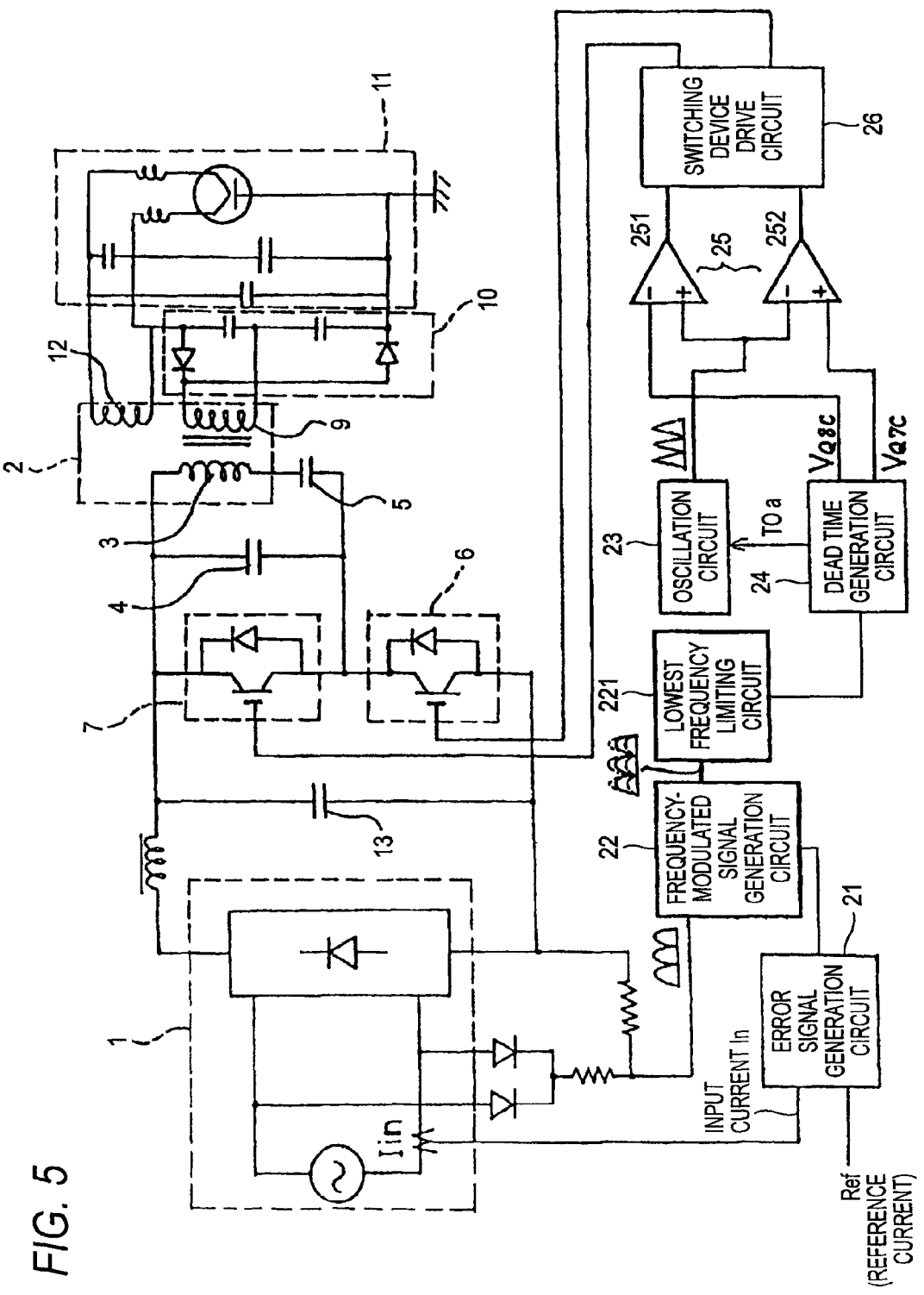
FIG. 5 shows high-frequency heating apparatus to be driven by a two-transistor bridge according to the present invention.

FIG. 5 shows high-frequency heating apparatus to be driven by a two-transistor bridge according to the present invention.

Figure 2:
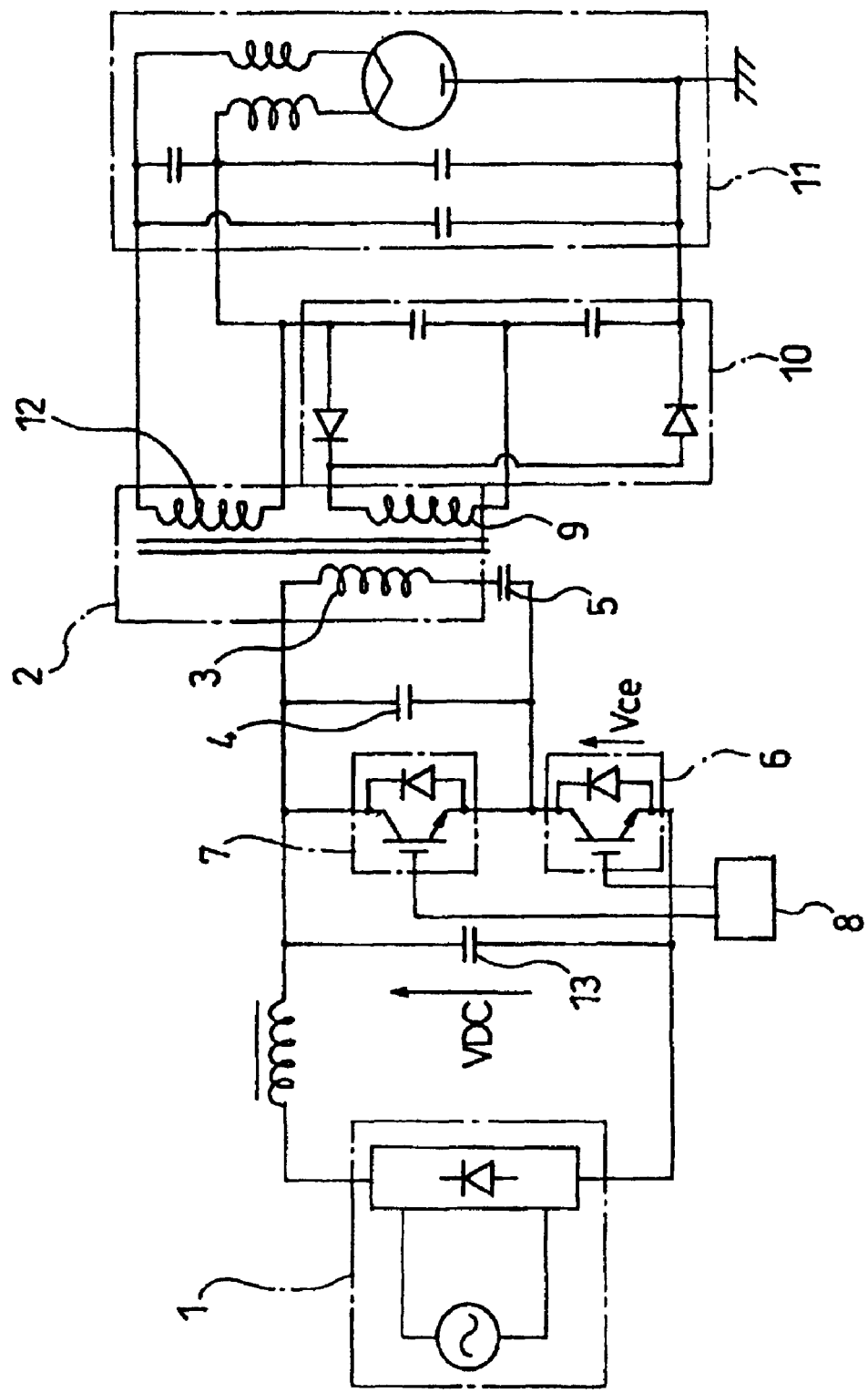
FIG. 2 shows an example of resonance type high-frequency heating apparatus driven by two-transistor bridge switching devices disclosed in Patent Document 1.
Figure 3:
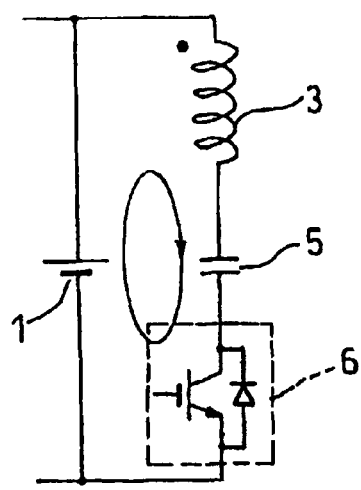
FIG. 3 shows modes in which a circuit in FIG. 2 operates, respectively.
Figure 3:
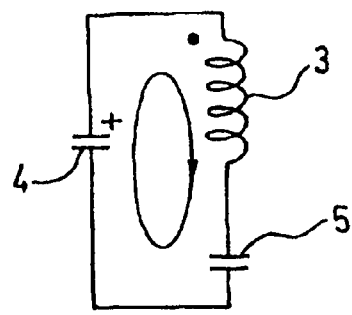
Figure 3:
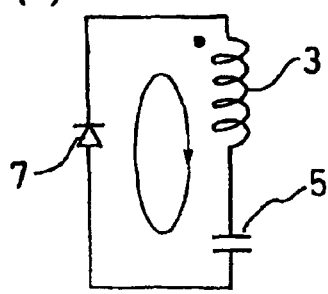
Figure 3:
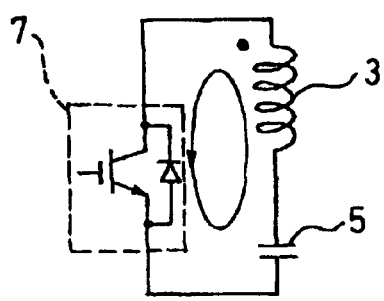
Figure 3:
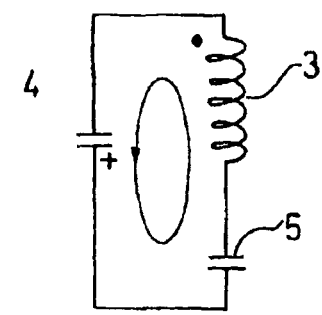
Figure 3:
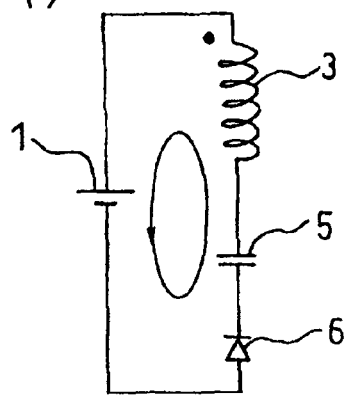
Figure 4:
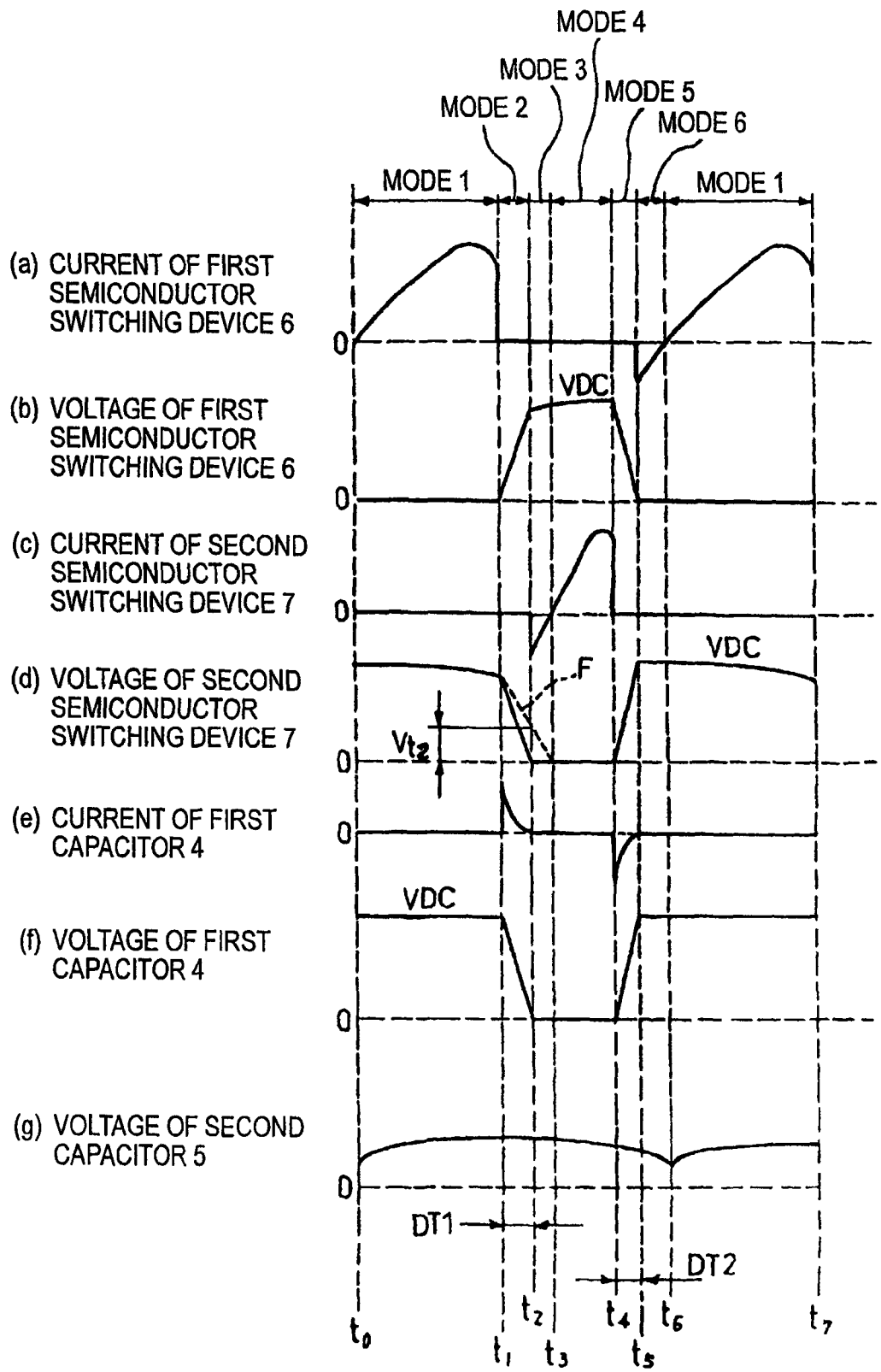
FIG. 4 shows voltage-current waveform charts of parts such as semiconductor switching devices etc. in the circuit.

In FIG. 5, a main circuit of this high-frequency heating apparatus is constituted by a DC power supply 1, a leakage transformer 2, a first semiconductor switching device 6, a first capacitor 4, a second capacitor 5, a third capacitor (smoothing capacitor) 13, a second semiconductor switching device 7, a drive portion 8, a full-wave voltage-doubler rectifier circuit 10, and a magnetron 11. The configuration of the main circuit is the same as that in FIG. 2, and redundant description thereof will be omitted.

Then, a control circuit for controlling the semiconductor switching devices 6 and 7 is constituted by an error signal generation circuit 21 for obtaining a difference between an input current Iin and a reference current Ref based thereon, a frequency-modulated signal generation circuit 22 for generating a frequency-modulated signal from the error signal generation circuit 21 and an AC full-wave signal, a lowest frequency limiting circuit 221 for carrying out soft start for attaining the object of the present invention, an oscillation circuit 23 for generating a triangular wave carrier, a dead time generation circuit 24 for varying a dead time in accordance with the magnitude of a switching frequency, a rectangular wave forming circuit 25 for forming rectangular waves from a triangular wave output of the oscillation circuit 23 and outputs VQ7C and VQ8C of the dead time generation circuit 24, and a switching device driving circuit 26 for generating pulses for turning on/off the switching devices in accordance with outputs of the rectangular wave forming circuit 25. Outputs of the switching device driving circuit 26 are applied to gates of the switching devices (IGBTs) 6 and 7 respectively.

Figure 6:
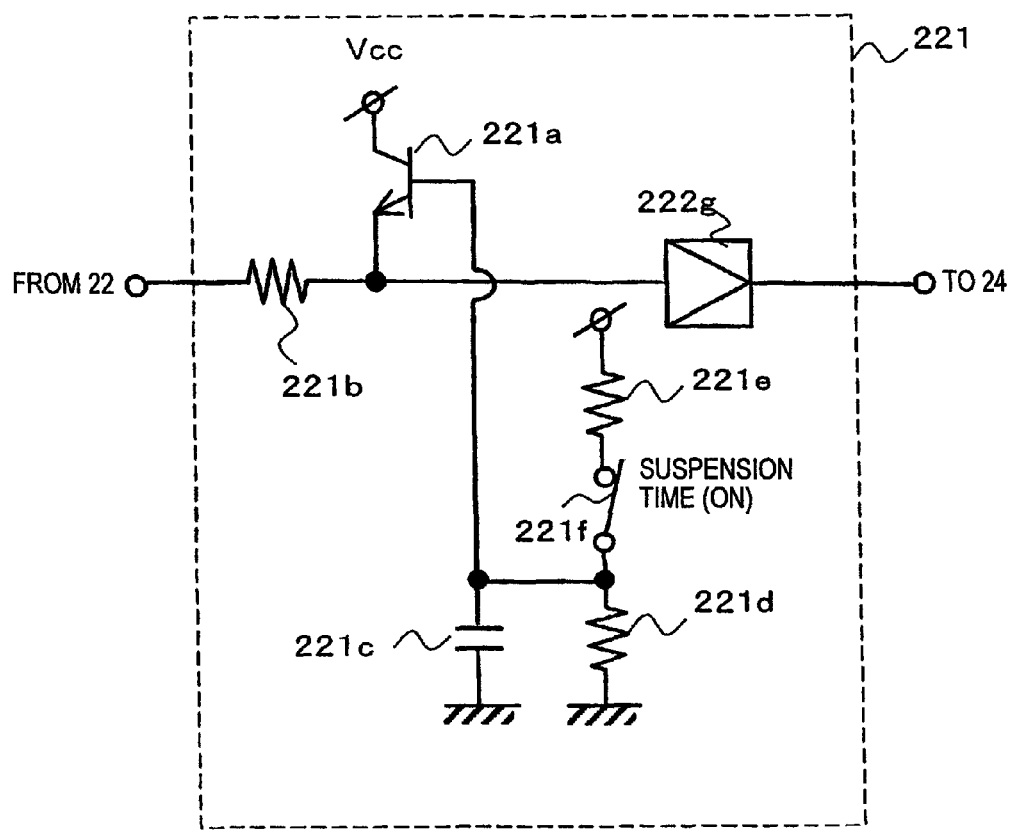
FIG. 6 shows a first embodiment of a lowest frequency limiting circuit for carrying out soft start.
Figure 6:
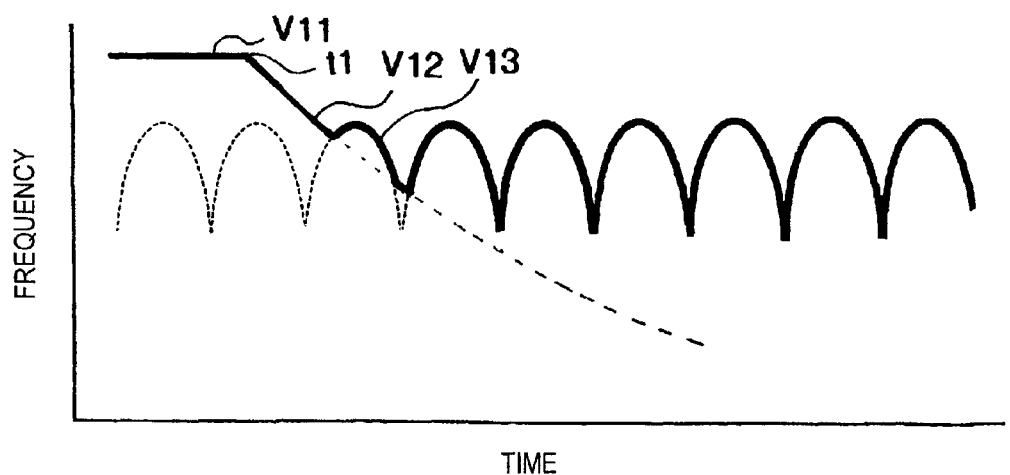

FIG. 6 shows a first embodiment of a lowest frequency limiting circuit for carrying out soft start.

In FIG. 6, the reference numeral 221 represents a lowest frequency limiting circuit according to the first embodiment. This lowest frequency limiting circuit 221 has a transistor 221a, resistors 221b, 221d and 221e, a capacitor 221c, a switch 221f and an amplifier 221g. The emitter, collector and base of the transistor 221a are connected to the resistor 221b, a power supply Vcc, and the capacitor 221c, respectively. One end of the resistor 221b is connected to the output side of the frequency-modulated signal generation circuit 22, and the other end thereof is connected to the emitter of the transistor 221a as mentioned above. One end of the capacitor 221c is connected to the base of the transistor 221a as mentioned above, and the other end thereof is connected to the ground. One end of the resistor 221e is connected to the power supply Vcc, and the other end thereof is connected to the ground through the switch 221f and the resistor 221d. The switch 221f is a normally closed contact which will be turned on when the apparatus is suspended. The resistor 221d side terminal of the switch 221f is connected to the positive side of the capacitor 221c.

Next, the operation of this lowest frequency limiting circuit 221 will be described with reference to (b) of FIG. 6.

The switch 221f is in an ON state during suspension of operation of the high-frequency heating apparatus. Accordingly, the capacitor 221c is charged to potential defined by the division ratio of the voltage Vcc between the resistors 221e and 221d. As a result, the transistor 221a has high base potential such that the transistor 221a is in an ON state. Thus, a high voltage V11 is output from the output terminal of the lowest frequency limiting circuit 221 (V11 in (b) of FIG. 6).

When the high-frequency heating apparatus begins to operate (t1 in (b) of FIG. 6), the switch 221f is opened (OFF) so that the charging circuit for the capacitor 221 is cut off. As a result, the capacitor 222 begins to discharge through the resistor 221d. Accordingly, the base potential of the transistor 221a decreases gradually so that output potential V12 (V12 in (b) of FIG. 6) of the transistor 221a decreases gradually to draw a curve. An output signal (full-wave rectified) of the frequency-modulated signal generation circuit 22 is put into the lowest frequency limiting circuit 221, and connected with an output signal of the transistor 221a by a wired OR circuit. Accordingly, a higher one of the output potential of the transistor 221a and the output potential of the frequency-modulated signal generation circuit 22 is output from the lowest frequency limiting circuit 221, so as to reach a stationary high-frequency voltage (V13 in (b) of FIG. 6).

Thus, (b) of FIG. 6 shows the output voltage from the lowest frequency limiting circuit 221 till the high-frequency heating apparatus under suspension of operation starts operation and reaches the stationary state through the transient state.

Figure 7:
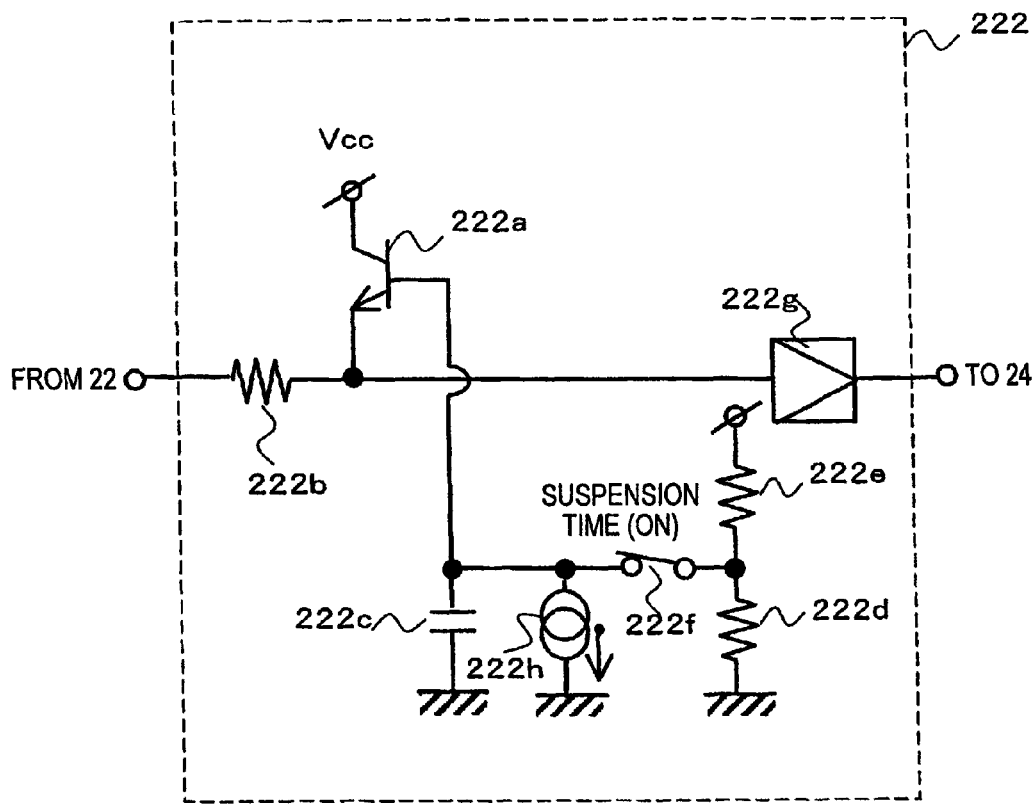
FIG. 7 shows a second embodiment of a lowest frequency limiting circuit for carrying out soft start.
Figure 7:
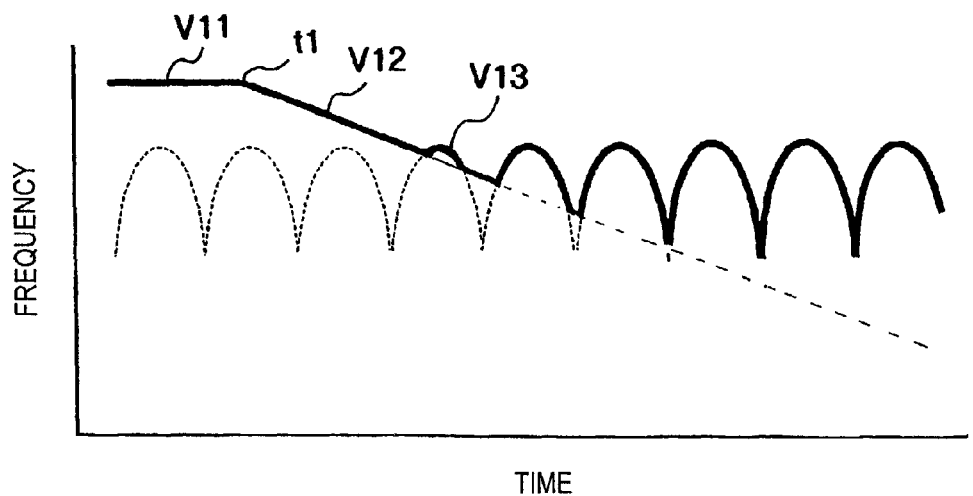

FIG. 7 shows a second embodiment of a lowest frequency limiting circuit for carrying out soft start.

In FIG. 7, the reference numeral 222 represents a lowest frequency limiting circuit according to the second embodiment. This lowest frequency limiting circuit 222 has a transistor 222a, resistors 222b, 222d and 222e, a capacitor 222c, a switch 222f, an amplifier 222g, and a constant current source 222h. The emitter, collector and base of the transistor 222a are connected to the resistor 222b, a power supply Vcc, and the capacitor 222c, respectively. One end of the resistor 222b is connected to the output side of the frequency-modulated signal generation circuit 22, and the other end thereof is connected to the emitter of the transistor 222a as mentioned above. One end of the capacitor 222c is connected to the base of the transistor 222a as mentioned above, and the other end thereof is connected to the ground. One end of the resistor 222e is connected to the power supply Vcc, and the other end thereof is connected to the ground through the resistor 222d. The switch 222f is a normally closed contact which will be turned on when the apparatus is suspended. One end of the switch 222f is connected to the positive side of the capacitor 222c, and the other end thereof is connected to a connection point between the resistor 222e and the resistor 222d. The constant current source 222h is connected to the opposite ends of the capacitor 222c.

Next, the operation of this lowest frequency limiting circuit 222 will be described with reference to (b) of FIG. 7.

The switch 222f is in an ON state during suspension of operation of the high-frequency heating apparatus. Accordingly, the capacitor 222c is charged to potential (slightly influenced by the constant current source 222h, and the degree of the influence depends on the combined impedance of the resistors 222e and the 222d and the value of the constant current source) defined by the division ratio of the voltage Vcc between the resistors 222e and 222d. Thus, the capacitor 222c is charged by the voltage Vcc. As a result, the transistor 222a has high base potential such that the transistor 222a is in an ON state. Thus, a high voltage V11 is output from the output terminal of the lowest frequency limiting circuit 222 (V11 in (b) of FIG. 7).

When the high-frequency heating apparatus begins to operate (t1 in (b) of FIG. 7), the switch 222f is opened (OFF) so that the charging circuit for the capacitor 222 is cut off. As a result, the capacitor 222 begins to discharge through the constant current source 222h. Accordingly, the base potential of the transistor 222a decreases gradually so that output potential V12 (V12 in (b) of FIG. 7) of the transistor 222a decreases gradually to draw a straight line due to the function of the constant current source 222h. An output signal (full-wave rectified) of the frequency-modulated signal generation circuit 22 is put into the lowest frequency limiting circuit 222, and connected with an output signal of the transistor 222a by a wired OR circuit. Accordingly, a higher one of the output potential of the transistor 222a and the output potential of the frequency-modulated signal generation circuit 22 is output from the lowest frequency limiting circuit 222, so as to reach a stationary high-frequency voltage (V13 in (b) of FIG. 7).

Thus, (b) of FIG. 6 shows the output voltage from the lowest frequency limiting circuit 222 till the high-frequency heating apparatus under suspension of operation starts operation and reaches the stationary state through the transient state.

Collector voltages of transistors Q8 and Q7 are sent from the dead time generation circuit 24 to the rectangular wave forming circuit 25 respectively (FIG. 5). In addition, a triangular wave output of the oscillation circuit 23 is also sent to the rectangular wave forming circuit 25.

The rectangular wave forming circuit 25 has two comparators 251 and 252. The collector voltage VQ8C of the transistor Q8 is applied to an inverting input terminal (−) of the comparator 251, and the collector voltage VQ7C of the transistor Q7 is applied to a non-inverting input terminal (+) of the comparator 252, while the triangular wave output of the oscillation circuit 23 is applied to a non-inverting input terminal (+) of the comparator 251 and an inverting input terminal (−) of the comparator 252.

Each comparator 251, 252 is designed to have no output (zero potential) when the potential of its non-inverting input terminal (+) is lower than the potential of its inverting input terminal (−), and to have an output (high potential) when the potential of its non-inverting input terminal (+) is beyond the potential of its inverting input terminal (−)

The dead time DT can be classified into the following three categories.

(1): Dead time made constant (fixed) regardless of frequency.

This is a method having been used in the background art.

On the contrary, the following two categories (2) and (3) are conceivable as dead times made variable in accordance with switching frequency.

(2): Dead time increased continuously in accordance with increase of switching frequency when the switching frequency is beyond a predetermined one.

(3): Dead time increased stepwise in accordance with increase of switching frequency when the switching frequency is beyond a predetermined one.

Then, the circuit for carrying out soft start according to the present invention can be applied to any one of the aforementioned categories (1) to (3).

Figure 8:
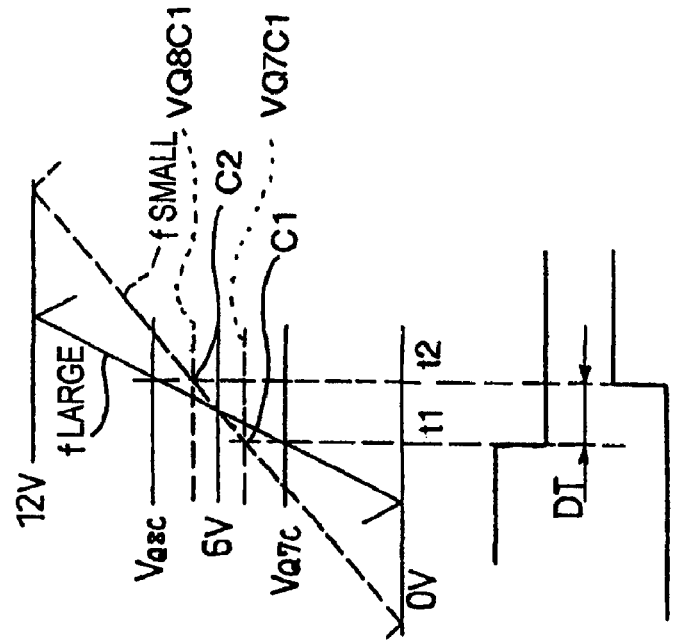
FIG. 8 is a diagram for explaining the principle for generating a dead time, (a) of FIG. 8 being a diagram for explaining the relationship between each output of an oscillation circuit and a dead time generation circuit and the output of a rectangular wave forming circuit, (b) of FIG. 8 being a diagram for explaining the principle with which a dead time DT is fixed even when the frequency is changed in a range in which the frequency is low.
Figure 8:
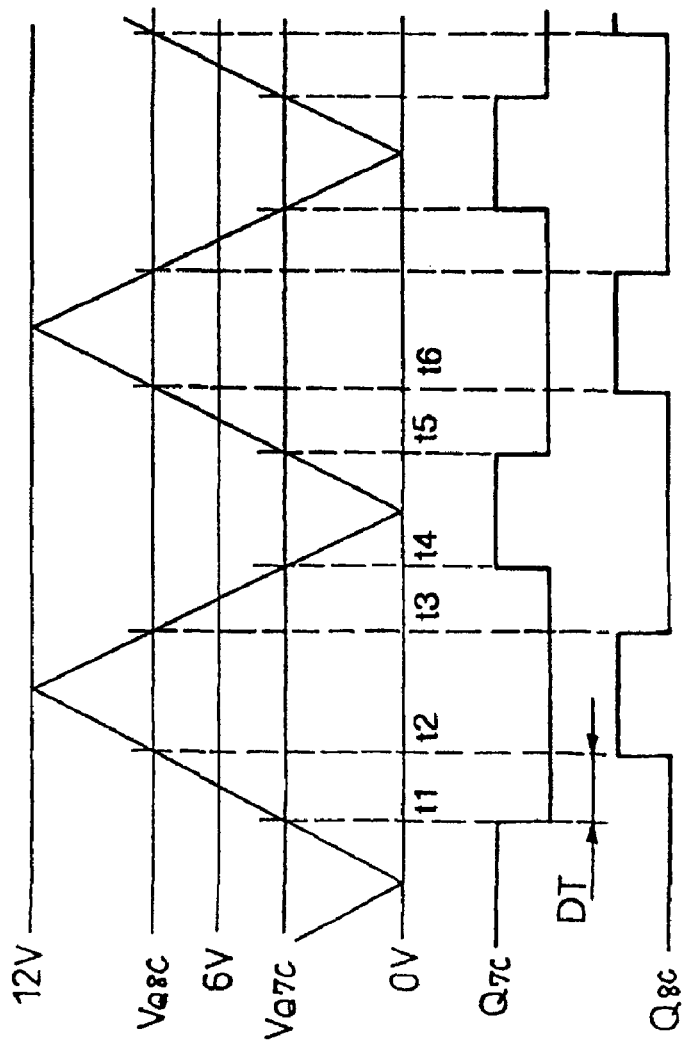

FIG. 8 is a diagram for explaining the principle for generating the aforementioned dead time (2) increased continuously in accordance with increase of switching frequency when the switching frequency is beyond a predetermined one. (a) of FIG. 8 is a diagram for explaining the relationship between each output of the oscillation circuit 23 and the dead time generation circuit 24 and the output of the rectangular wave forming circuit 25. (b) of FIG. 8 is a diagram for explaining the principle with which the dead time DT is fixed when the switching frequency is not higher than the predetermined frequency.

In FIG. 8, in the comparator 252 (see FIG. 5) before a time t1, the potential VQ7C of the non-inverting input terminal (+) is beyond the potential of the triangular wave of the inverting input terminal (−). Accordingly, the semiconductor switching device is on (output 1). At the same time, in the comparator 251, the potential of the triangular wave of the non-inverting input terminal (+) is lower than the potential VQ8C of the inverting input terminal (−). Thus, the semiconductor switching device is off (output 0).

(1) At the time t1, the comparator 252 outputs 0 because the potential VQ7C of the non-inverting input terminal (+) is lower than the potential of the triangular wave of the inverting input terminal (−).

(2) From t1 to t4, the comparator 252 keeps outputting 0.

(3) At the time t2, the comparator 251 outputs 1 because the potential of the triangular wave of the non-inverting input terminal (+) is higher than the potential VQ8C of the inverting input terminal (−).

(4) From t2 to t3, the comparator 251 keeps outputting 1.

(5) At the time t3, the comparator 251 outputs 0 because the potential of the triangular wave of the non-inverting input terminal (+) is lower than the potential VQ8C of the inverting input terminal (−).

(6) At the time t4, the comparator 252 outputs 1 because the potential VQ7C of the non-inverting input terminal (+) is higher than the potential of the triangular wave of the inverting input terminal (−).

(7) From t4 to t5, the comparator 252 keeps outputting 1.

(8) At the time t5, the comparator 252 outputs 0 because the potential VQ7C of the non-inverting input terminal (+) is lower than the potential of the triangular wave of the inverting input terminal (−).

(9) From t3 to t6, the comparator 251 keeps outputting 0.

After that, similar operation is repeated.

The outputs of the comparators 251 and 252 are applied to the switching device (IGBT) driving circuit 26 so that the switching devices 6 and 7 are turned on/off at one and the same timing.

In such a manner, the periods t1-t2, t3-t4 and t5-t6 when the switching devices 6 and 7 are off concurrently are obtained as the dead times DT.

The duration of each dead time DT is constant (fixed) regardless of frequency in the background art. To improve this, the dead time DT can be made variable in accordance with the switching frequency. Here, the dead time DT is set as a predetermined unchanged value (or a marginally increasing value) when the switching frequency is lower than a predetermined frequency f1, while the dead time DT is increased when the switching frequency is larger than the predetermined frequency f1.

Therefore, the principle with which the dead time DT becomes a predetermined unchanged value when the switching frequency is lower than the predetermined frequency f1 will be described with reference to (b) of FIG. 8.

In (b) of FIG. 8, when the frequency is high (solid line), the following relationship is established among VQ8C, VQ7C and the triangular wave as described previously with reference to the solid lines of VQ8C, VQ7C and the triangular wave in (a) of FIG. 8. That is, the output becomes 0 at the time t1 when the potential VQ7C is lower than the potential of the triangular wave. At the time t2, the potential of the triangular wave is higher than the potential VQ8C so that the output becomes 1. Thus, the period between the time t1 and the time 2 is secured as the dead time DT.

When the frequency becomes low, the triangular wave becomes a triangular wave whose inclination becomes gentle, as shown by the broken line. Therefore, here, in order to obtain the same dead time DT, offset voltages are defined to set the potentials VQ7C and VQ8C as potentials VQ7C1 and VQ8C1 passing intersection points C1 and C2 between the triangular wave shown by the broken line and vertical lines drawn from the time t1 and the time t2 respectively. Since resistors R8 and R7 are fixed, currents I8 and I7 by which such offset voltages can be obtained are made to flow into the resistors R8 and R7 respectively.

In such a manner, even when the frequency changes so that the triangular wave changes from the solid line to the broken line, the triangular wave shown by the broken line cuts across the two potentials VQ7C1 and VQ8C1 at the same times t1 and t2 respectively. Accordingly, the dead time DT is unchanged.

Figure 9:
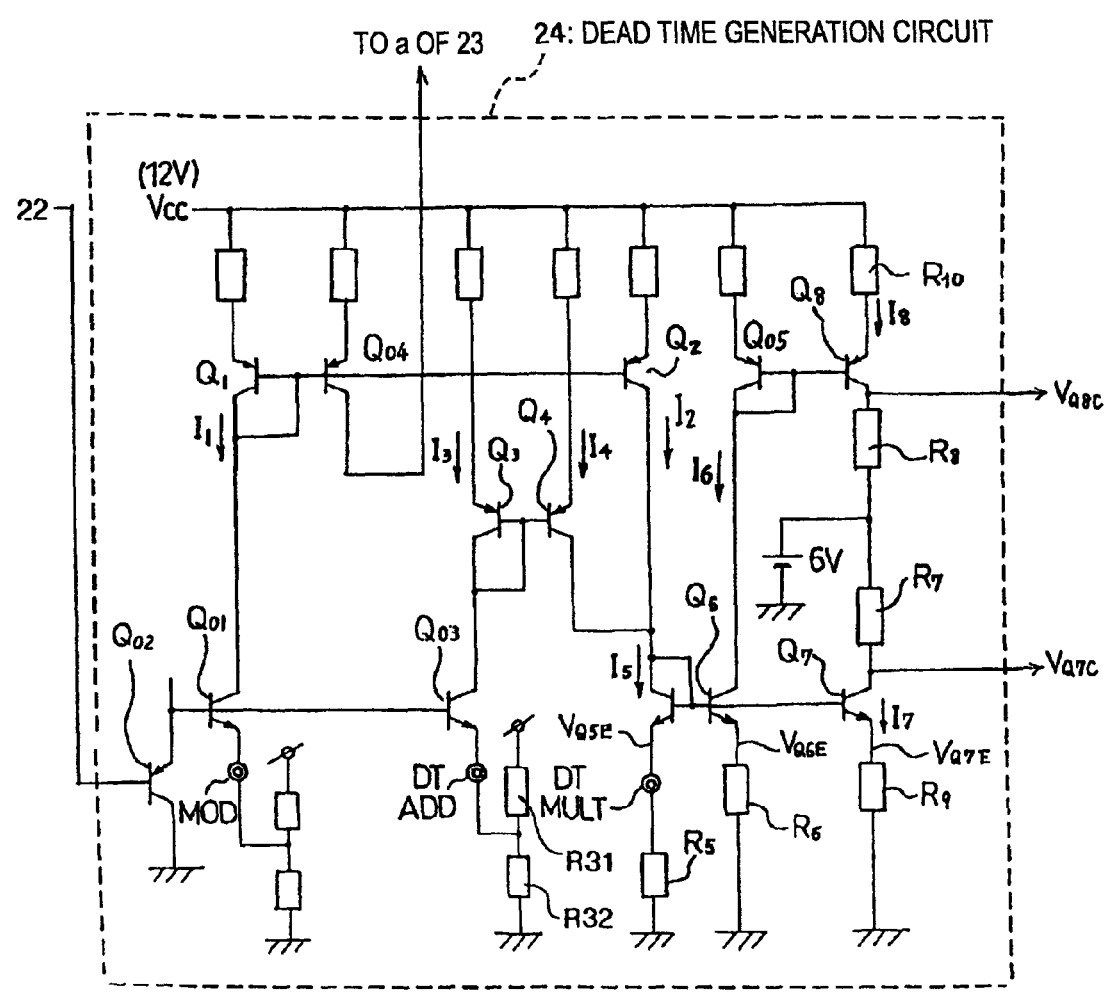
FIG. 9 shows a specific example of the dead time generation circuit.

FIG. 9 shows a specific example of the dead time generation circuit.

Figure 13:
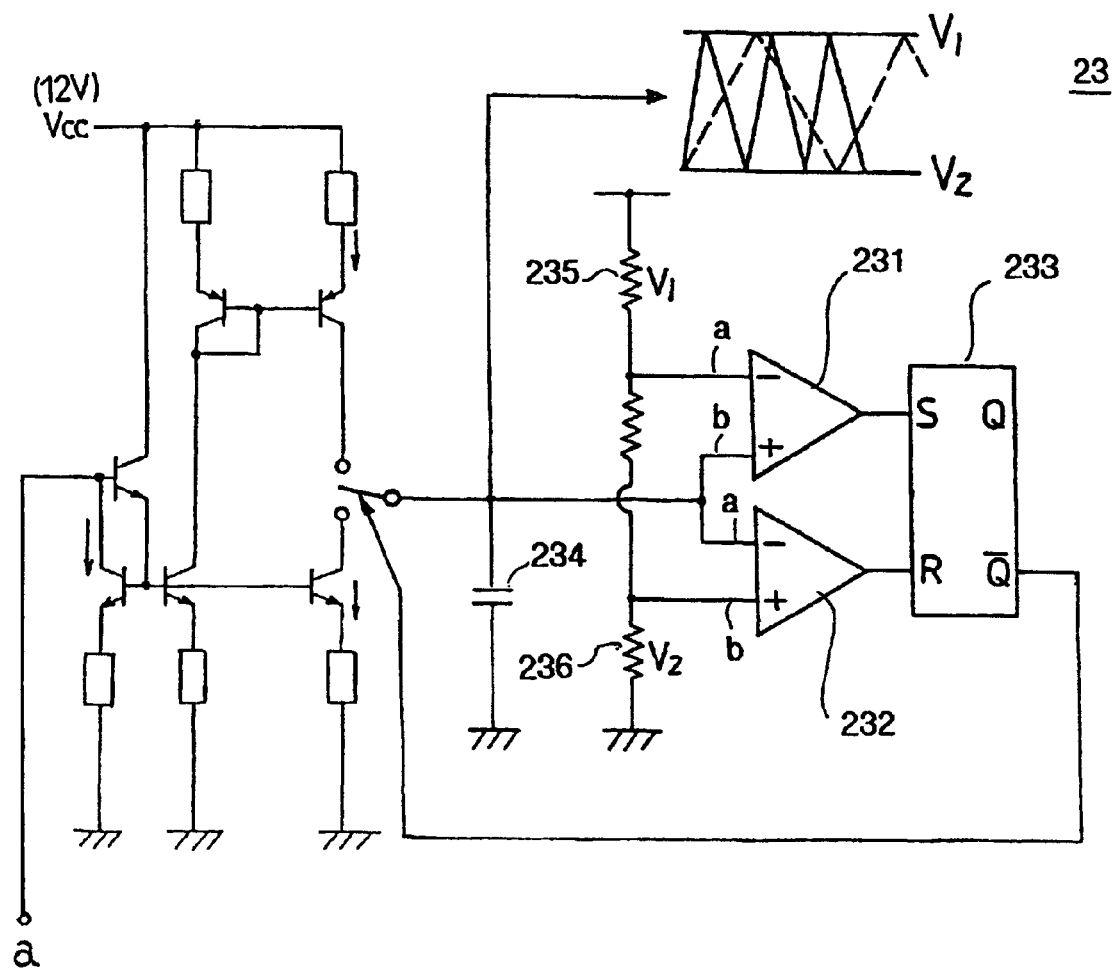
FIG. 13 shows an example of the oscillation circuit in FIG. 5.

In FIG. 9, Q01, Q02, and Q1-Q8 represent transistors, and R1-R10 represent resistors. Assume that I1, I3, I4, I5, I6, I7 and I8 designate currents flowing through the transistors Q1, Q3, Q4, Q5, Q6, Q7 and Q8 respectively, VQ5E, VQ6E and VQ7E designate emitter potentials of the transistors Q5, Q6 and Q7, and VQ7C and VQ8C designate collector potentials of the transistors Q7 and Q8. A current mirror circuit is constituted by the transistors Q1 and Q2. In the same manner, current mirror circuits are constituted by the transistors Q1 and Q04, the transistors Q3 and Q4, and the transistors Q05 and Q8, respectively. The output of the transistor Q04 is applied to the oscillation circuit 23 (FIG. 13).

In addition, the emitter sides of the transistors Q1 and Q3 are connected to Vcc, and the collector sides thereof are connected to the collector sides of the transistors Q01 and Q03 respectively. The emitter sides of the transistors Q01 and Q03 are connected to a terminal MOD and a terminal DTADD respectively, and the terminal MOD and the terminal DTADD are grounded through dividing resistors respectively. The bases of the transistors Q01 and Q03 are connected to the emitter side of the transistor Q02, and the collector side of the transistor Q02 is grounded. A control voltage of an oscillation frequency which is an output of the frequency-modulated signal generation circuit 22 (FIG. 5) is applied to the base of the transistor Q02.

A series-connection circuit of the resistor R10, the resistor R8, the resistor R7 and the resistor R9 in order of increasing distance from Vcc is provided between Vcc (12 V here) and the ground. In addition, the transistor Q8 is provided between the resistor R10 and the resistor R8 so that the emitter side is connected to the resistor R10 and the collector side is connected to the resistor R8. Further, the transistor Q7 is provided between the resistor R7 and the resistor R9 so that the emitter side is connected to the resistor R9 and the collector side is connected to the resistor R7. A ½ Vcc (6 V here) is applied between the resistor R8 and the resistor R7. Around this 6 V, the voltage drop in the upper resistor R8 is expressed by I8×R8, and the voltage drop in the lower resistor R7 is expressed by I7×R7. The current I8 and the current I7 are varied in accordance with frequency. Thus, the voltage drops of the resistors R7 and R8 are varied in accordance with frequency, so that the offset voltages VQ8C and VQ7C are varied around 6 V.

A base voltage of the transistor Q05 constituting a current mirror circuit is applied to the base of the transistor Q8. When the characteristics of the transistors Q05 and Q8 are equal to each other, and the resistance values thereof are equal to each other, the relations I6=I7=I8 and I3=I4 are established.

However, the present invention is not limited to the relations I1=I2, I3=I4 and I6=(I7=I8). It will go well if proportionality relations are established among them.

Incidentally, the relation I7=I8 is essential.

Next, description will be made about the operation of the dead time generation circuit (that is, to keep the dead time DT unchanged (or marginally increased) when the switching frequency is not higher than a predetermined frequency, and to increase the dead time DT when the switching frequency is not lower than the predetermined frequency).

1) Reason why the dead time DT is unchanged (or marginally increased) in a range where I3 does not flow (that is, in a range where the oscillation frequency is low):

In a range where I3 does not flow, the following relations are established.

$$I1=I2=I5$$

$$VQ5E=VQ6E=VQ7E, \text{ and}$$

$$I5 \times R5 = I6 \times R6 = I7 \times R9 = I1 \times R5$$

The currents I8 and I7 flowing into the transistors Q8 and Q7 are expressed respectively by:

$$I8=I6=I1 \times (R5/R6)$$

$$I7=I1 \times (R5/R9)$$

The offset voltages VR8 and VR7 are expressed respectively by:

$$VR8 = I8 \times R8$$
$$= \{I1 \times (R5/R6)\} \times R8$$
$$= I1 \times R5 \times (R8/R6)$$
$$VR7 = I1 \times R5 \times (R7/R9)$$

Since VQ8C and VQ7C are obtained by adding and subtracting the aforementioned offset voltages to and from 6V, VQ8C and VQ7C are expressed by:

$$VQ8C=6V+VR8=6V+I1 \times R5 \times (R8/R6)$$

$$VQ7C=6V-VR7=6V-I1 \times R5 \times (R7/R9) \quad (1)$$

In such a manner, the currents I8 and I7 in the range where the frequency is low (the dead time may be fixed) have a proportionality relation to the charge/discharge current I1 of the triangular wave. Accordingly, the currents I8 and I7 can be used as values some times as large as the charge/discharge current I1 of the triangular wave. This can obtain a mirror circuit as shown in FIG. 9. The currents I6 and I8 are placed in a fixed relation with respect to the current I5 so that the currents I6 and I8 coincide with each other, while the current I7 is placed in a fixed relation to the current I5 so that the current I7 coincides with the current I8.

Figure 10:
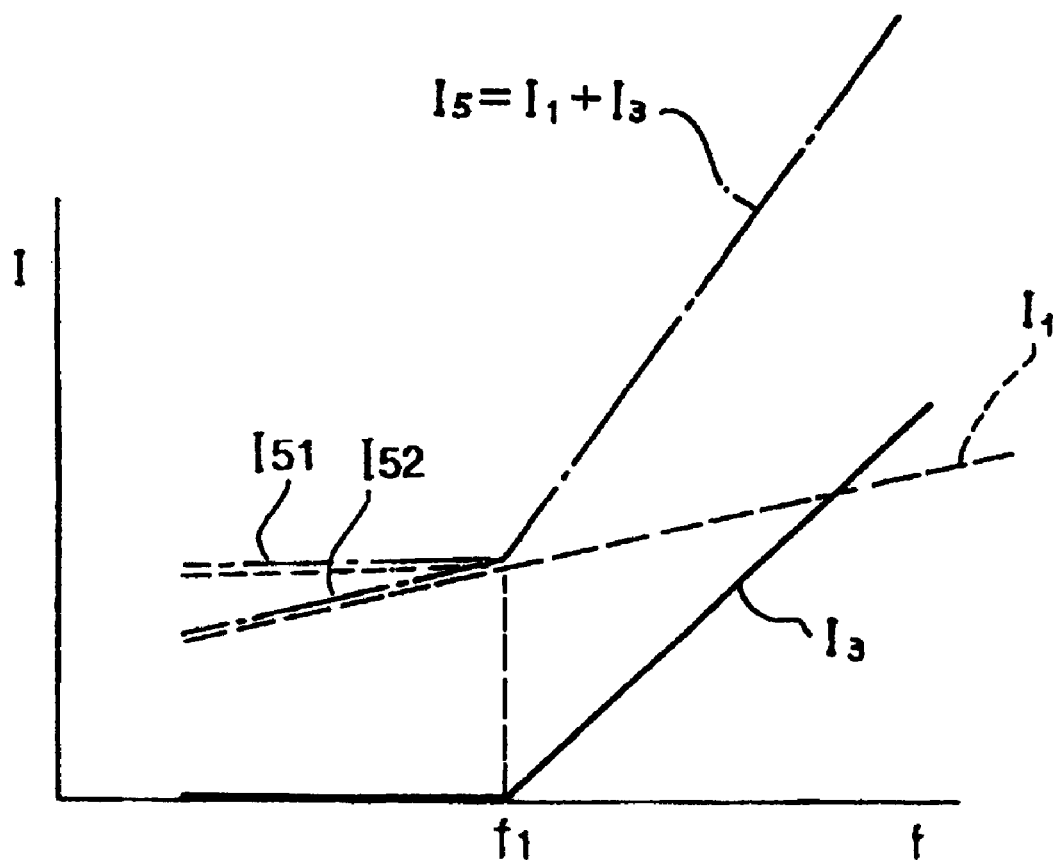
FIG. 10 shows the current-to-frequency characteristic of the dead time generation circuit.

FIG. 10 shows the current-to-frequency characteristic of a variable dead time generation circuit.

In FIG. 10, I1, I3 and I5 designate currents flowing into the transistors Q1, Q3 and Q5 in FIG. 9 respectively. The current I5 is expressed by I1+I3.

In a low frequency not higher than f1, the current I1 (I5) is a fixed value (I51) or a marginally increasing value (I52). On the other hand, in a range where the frequency is not lower than f1, the current I3 begins to flow steeply at the frequency f1 as a point of inflection. Thus, the current I5 which is the sum of I3 and I1 increases suddenly.

It is understood from the aforementioned expressions (1) of VQ8C and VQ7C and FIG. 10 that offset voltages proportional to the charge/discharge current I1 of the capacitor of the oscillation circuit can be obtained for both VQ8C and VQ7C respectively in a range where the oscillation frequency is low, so that the dead time is constant when the charge/discharge current I1 is constant, and the dead time increases marginally when the charge/discharge current I1 increases marginally, as shown in FIG. 10.

2) On the other hand, in a range where the current I3 flows (that is, in a range where the oscillation frequency is high), the dead time DT is variable. That reason will be described next.

In FIG. 9, the current I3 is zero in a range where the oscillation frequency is low, but the current I3 is made to flow in the following manner in a range where the oscillation frequency is high. That is, when the emitter potential of the transistor Q02 as an oscillation frequency control voltage is lower than the potential of the contact point DTADD, the transistor Q03 connected to the terminal DTADD is not turned on (therefore, the current I3 does not flow). However, when the emitter potential of the transistor Q02 as an oscillation frequency control voltage is higher than the potential of the terminal DTADD, the transistor Q03 connected to the terminal DTADD is turned on so that the current I3 flows. In FIG. 10, the current I51 is fixed or the current I52 increases marginally in a range where the oscillation frequency is lower than f1. However, the current I3 having been zero till then begins to flow suddenly in a range where the oscillation frequency is higher than f1. Thus, the current is expressed by I5=I1+I3.

In the range where the current I3 flows, the current I5 is expressed by:

$$I5=I2+I4=I1+I3$$

$$I5 \times R5=I6 \times R6=I7 \times R9=(I1+I3) \times R5$$

Accordingly, the collector voltages of the transistors Q8 and Q7 are expressed by Expressions (2) respectively:

$$VQ8C=6V+VR8=6V+(I1+I3) \times R5 \times (R8/R6)$$

$$VQ7C=6V-VR7=6V-(I1+I3) \times R5 \times (R7/R9) \qquad (2)$$

Similar effect can be obtained in a circuit where the third capacitor 5 is omitted in a circuit of (a) by setting the capacitances of a first capacitor 41 and a second capacitor 42.

It is understood from the aforementioned expressions (2) of VQ8C and VQ7C and FIG. 10 that offset voltages proportional to the current I3 can be obtained for both VQ8C and VQ7C respectively, so that the current I5 increases when the current I3 increases suddenly as shown in FIG. 10. Since the collector potentials VQ8C and VQ7C of the transistors Q8 and Q7 are expressed by functions of the current I5 (=I1+I3) respectively, the collector potentials VQ8C and VQ7C of the transistors Q8 and Q7 increase as the current I5 increases. Then, when the collector potentials VQ8C and VQ7C increase, the collector potential VQ8C increases to be higher than the illustrated position in FIG. 8, and the collector potential VQ7C decreases to be lower than the illustrated position in FIG. 8. As a result, the intersection point of VQ7C and the triangular wave where the dead time DT starts becomes earlier, while the intersection point of VQ8C and the triangular wave where the dead time DT is terminated becomes later. Thus, the dead time DT increases to be wider than the illustrated width.

Figure 12:
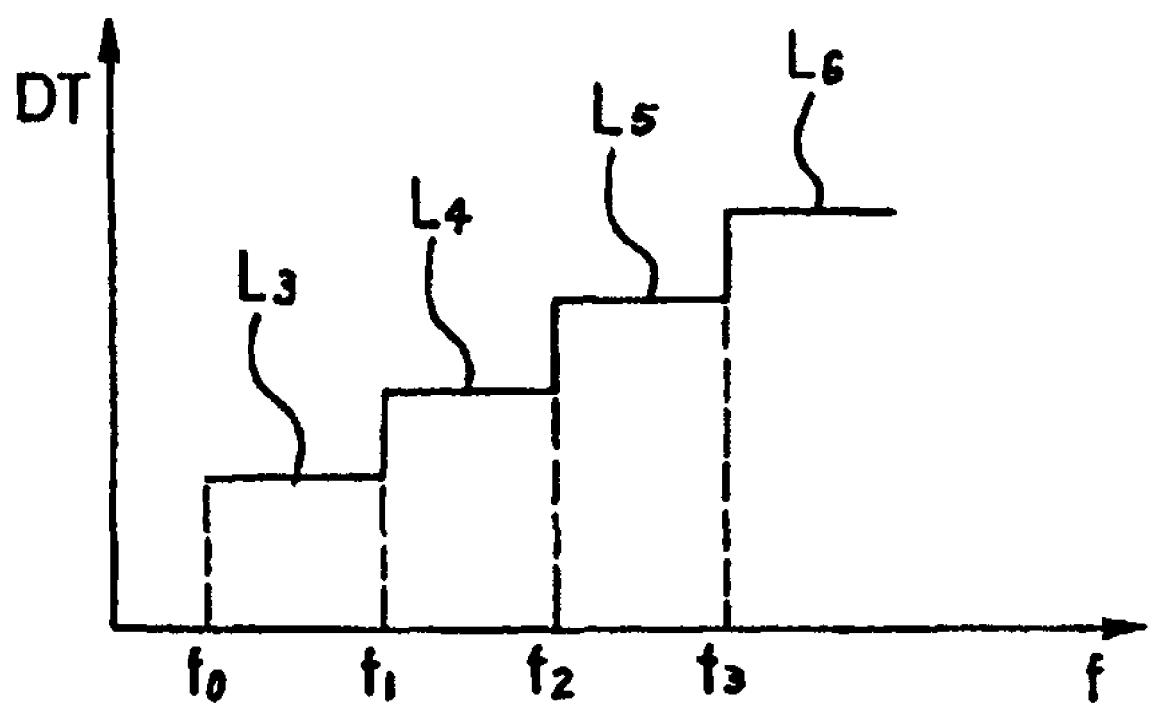
FIG. 12 shows a second embodiment in which the dead time is made variable.

FIG. 11 shows various examples of the aforementioned (2) "dead time DT increased continuously in accordance with increase of switching frequency when the switching frequency is beyond a predetermined one". FIG. 12 shows an example of the aforementioned (3) "dead time DT increased stepwise in accordance with increase of switching frequency when the switching frequency is beyond a predetermined one".

In (a) of FIG. 11, the dead time DT is fixed (or increased marginally) when the switching frequency is not higher than the predetermined frequency f1, while the dead time DT is increased suddenly when the switching frequency is not lower than the predetermined frequency f1.

(b) of FIG. 11 shows examples of modifications of (a) of FIG. 11.

In (イ) of (b) of FIG. 11, the aforementioned fixed value or marginally increased value L1 of the dead time at a switching frequency not higher than the predetermined frequency f1 in (a) of FIG. 11 is made variable as L11, L12, L13, and the suddenly increased value L2 of the dead time DT at a switching frequency not lower than the predetermined frequency f1 is made variable as L21, L22, L23.

This can be attained by changing the ratio of the resistor R5 to the resistor R6 in a terminal DTMULTI in FIG. 9. That is, according to the relation I5×R5=I6×R6, the ratio of I5 to I6 is changed when the ratio of R5 to R6 is changed. The value I6 defines the values I7 and I8. Accordingly, when the ratio of I5 to I6 is changed, the values I7 and I8 with respect to the value I5 are also changed so that the offset voltages from 6 V are also changed. Thus, the dead time DT is also changed. In such a manner, the dead time DT can be changed in spite of one and the same frequency.

In (ロ) of (b) of FIG. 11, the dead time gradient in the predetermined switching frequency f1 in (a) of FIG. 11 is made variable as L24, L25, L26.

This gradient depends on the combined resistance value of upper and lower resistors R31 and R32 in the contact point DTADD. When the combined resistance value is large, the current flowing from Vcc does not flow much. Accordingly, the gradient becomes small (L26). On the contrary, when the combined resistance value is small, the current flowing from Vcc becomes much. Accordingly, the gradient becomes large (L24). That is, when the current I3 flows much, the currents I7 and I8 also increase largely. Therefore, voltage drops of the resistors R7 and R8 are large so that the offset voltage from 6V increases. Thus, the collector voltages of the transistors Q8 and Q7 increase in accordance with the aforementioned expressions (2).

Incidentally, when the oscillation frequency is high, there is an effect that the dead time DT is narrowed. However, the increase of the offset voltage serves to elongate the dead time DT against the effect of the oscillation frequency.

In (ハ) of (b) of FIG. 11, the predetermined switching frequency f1 serving as a point of inflection in (a) of FIG. 11 is made variable as f0, f2.

This point of inflection can be varied in accordance with the resistance ratio of the upper and lower resistors R31 and R32 in the terminal DTADD. That is, this resistance ratio of the resistors R31 and R32 corresponds to the point of inflection because the current I3 begins to flow when an oscillation frequency control voltage applied to the base of the transistor q02 is beyond a voltage defined by the resistance ratio. When the resistor R31>the resistor R32, the voltage determined by the resistance ratio is so low that the current I3 begins to flow earlier. When the current I3 flows, the currents I7 and I8 also flow. Therefore, voltage drops occur in the resistors R7 and R8 so that the offset voltages from 6 V increase. As a result, the collector voltages of the transistors Q8 and Q7 increase in accordance with the aforementioned expressions (2) so that the dead time DT begins to increase earlier (f0). On the contrary, when the resistor R31<the resistor R32, the voltage defined by the resistance ratio is so high that it takes more time for the current I3 to begin to flow. Thus, the dead time DT begins to increase later (f2).

FIG. 12 shows a second embodiment of a variable dead time DT.

(a) of FIG. 11 shows the configuration in which the dead time DT has a border in the predetermined switching frequency f1 serving as a point of inflection such that the dead time DT is fixed or increased marginally as L1 when the switching frequency is not higher than f1, and the dead time DT is increased suddenly as L2 when the switching frequency is not lower than f1. On the other hand, FIG. 12 shows the configuration in which the dead time DT is increased stepwise as L3, L4, L5 and L6 respectively as the switching frequency increases to f0, f1, f2 and f3.

Such a stepwise configuration can be attained easily by using the method for generating the dead times L11, L12 and L13 as described in (イ) of (b) of FIG. 11. That is, the resistor R5 and the resistor R6 in the terminal DTMULTI in FIG. 9 are formed out of variable resistance elements such as transistors or the like, while the ratio between those variable resistance elements is changed at predetermined frequencies. Thus, the stepwise configuration can be obtained.

FIG. 13 shows an example of the oscillation circuit 23 in FIG. 5.

The oscillation circuit 23 has two comparators 231 and 232. A voltage V1 of a dividing resistor 235 is applied to an inverting input terminal a(−) of the comparator 231, and a voltage V2 (provided V1>V2) of a dividing resistor 236 is applied to a non-inverting input terminal b(+) of the comparator 232, while a voltage of a capacitor 234 is applied to a non-inverting input terminal b(+) of the comparator 231 and an inverting input terminal a(−) of the comparator 232.

Each comparator 231, 232 is designed to output 0 when the potential of its non-inverting input terminal b(+) is lower than the potential of its inverting input terminal a(−), and to output 1 when the potential of the non-inverting input terminal b(+) is higher than the potential of the inverting input terminal a(−).

Outputs of the operational amplifiers 231 and 232 are put into an S terminal and an R terminal of an SR flip-flop 233 respectively. A charge/discharge circuit for the capacitor 234 is formed by the output of a non-Q terminal of the SR flip-flop 233.

Thus, now when a charge circuit for the capacitor 234 is formed as shown in FIG. 13, the potential of the capacitor 234 increases. The potential of this capacitor 234 is output. With this, the potential of the non-inverting input terminal b(+) of the comparator 231 increases. When the potential of the non-inverting input terminal b(+) is higher than the potential V1 of the inverting input terminal a(−), the output of 1 is applied to the S terminal, and a discharge circuit for the capacitor 234 is formed by the output of the non-Q terminal. After that, the potential of the capacitor 234 drops down, and the potential of this capacitor 234 is output. With this, the potential of the non-inverting input terminal b(+) of the comparator 232 drops down. When the potential of the non-inverting input terminal b(+) is not higher than the potential V2 of the inverting input terminal a(−), the output of 1 is applied to the R terminal, and a charge circuit of the capacitor 234 is formed by the output of the non-Q terminal.

In such a manner, the charge/discharge potential for the capacitor 234 is output so that the triangular wave oscillation circuit 23 can be obtained. In addition, the gradient of the triangle wave is defined by the magnitude of a charging current Ir.

Incidentally, the inverter circuit of the high-frequency heating apparatus driven by the two-transistor bridge according to the present invention is not limited to the high-frequency heating apparatus shown in FIG. 5. The present invention is applicable to any inverter circuit if it is of a resonance type circuit system using switching devices forming an arm of the bridge out of two transistors.

Figure 14:
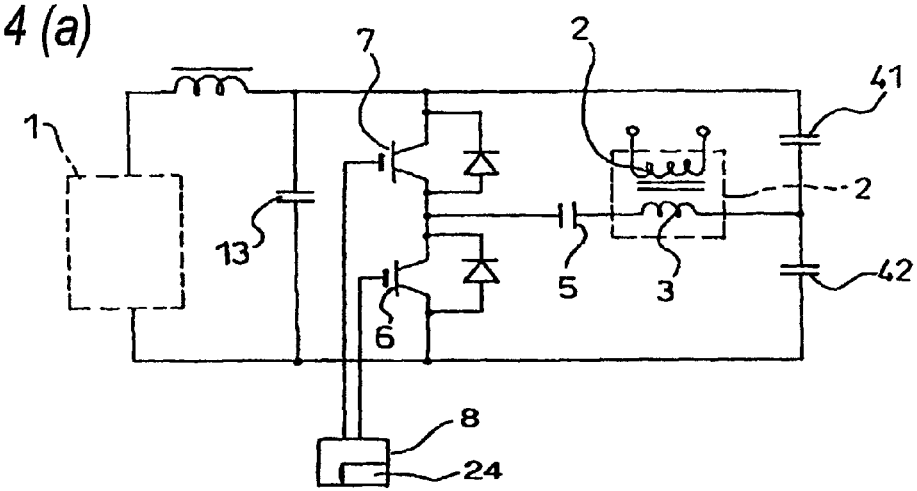
FIG. 14 shows three examples in resonance type high-frequency heating apparatus driven by two-transistor bridge switching devices.
Figure 14:
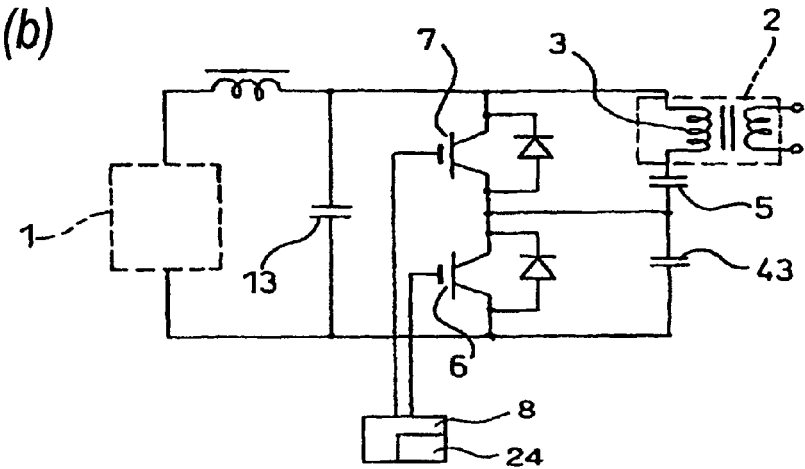
Figure 14:
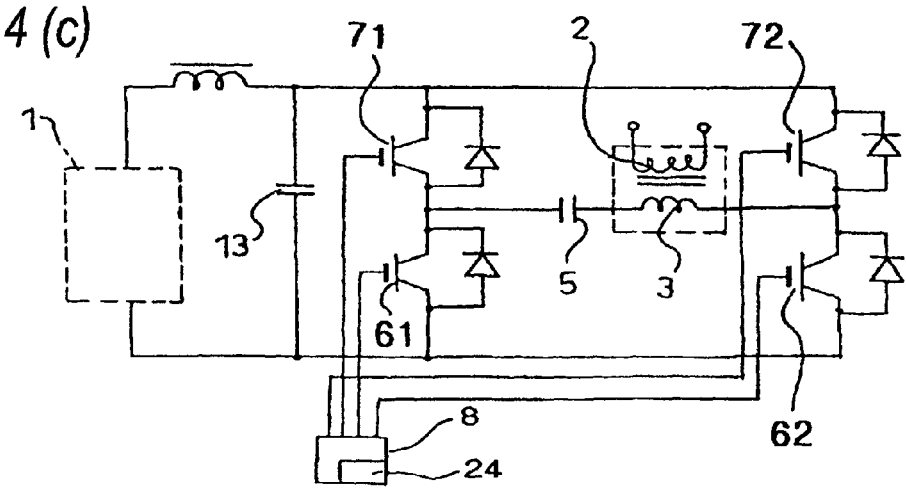

FIG. 14 shows three kinds of these inverter circuits.

In (a) of FIG. 14, a DC power supply 1 full-wave rectifies commercial power so as to apply a DC voltage VDC to a series-connection circuit of a first capacitor 41 and a second capacitor 42 and a series-connection circuit of a first semiconductor switching device 6 and a second semiconductor switching device 7. A series-connection circuit of a primary winding 3 of a leakage transformer 2 and a third capacitor 5 is connected between a connection point of the first capacitor 41 and the second capacitor 42 and a connection point of the first semiconductor switching device 6 and the second semiconductor switching device 7. Control signals from a drive portion 8 are supplied to the bases of the first semiconductor switching device 6 and the second semiconductor switching device 7 respectively. A dead time generation circuit 24 is incorporated in the drive portion 8. Incidentally, the secondary side of the leakage transformer 2 and a magnetron are not shown.

Then, the lowest frequency limiting circuit for carrying out soft start for attaining the object of the present invention can be also applied to this circuit just in the same manner as in FIG. 5. That is, in FIG. 5, it will go well if there are provided an error signal generation circuit 21 for obtaining a difference between an input current Iin and a reference current Ref based thereon, a frequency-modulated signal generation circuit 22 for generating a frequency-modulated signal from the error signal generation circuit 21 and an AC full-wave signal, a lowest frequency limiting circuit 221 for carrying out soft start for attaining the object of the present invention, an oscillation circuit 23 for generating a triangular wave carrier, a dead time generation circuit 24, a rectangular wave forming circuit 25 for forming rectangular waves from a triangular wave output of the oscillation circuit 23 and outputs VQ7C and VQ8C of the dead time generation circuit 24 respectively, and a switching device driving circuit 26 for generating pulses for turning on/off the switching devices in accordance with outputs of the rectangular wave forming circuit 25.

In such a manner, it is possible to obtain an inverter circuit in which short-circuit of a power supply is prevented from occurring, heat loss hardly occurs in IGBTs, therefore no useless energy is consumed, and noise hardly occurs, and in which soft start can be implemented by a simple circuit added thereto.

In (b) of FIG. 14, a DC power supply 1 full-wave rectifies commercial power so as to apply a DC voltage VDC to a series-connection circuit of a primary winding 3 of a leakage transformer 2, a first capacitor 5 and a second capacitor 43 and a series-connection circuit of a first semiconductor switching device 6 and a second semiconductor switching device 7. A short circuit is formed between a connection point of the first capacitor 5 and the second capacitor 43 and a connection point of the first semiconductor switching device 6 and the second semiconductor switching device 7. Control signals from a drive portion 8 are supplied to the bases of the first semiconductor switching device 6 and the second semiconductor switching device 7 respectively. A dead time generation circuit 24 is incorporated in the drive portion 8. Incidentally, the secondary side of the leakage transformer 2 and a magnetron are not shown.

Then, the lowest frequency limiting circuit for carrying out soft start for attaining the object of the present invention can be also applied to this circuit just in the same manner as in FIG. 5. That is, in FIG. 5, it will go well if there are provided an error signal generation circuit 21 for obtaining a difference between an input current Iin and a reference current Ref based thereon, a frequency-modulated signal generation circuit 22 for generating a frequency-modulated signal from the error signal generation circuit 21 and an AC full-wave signal, a lowest frequency limiting circuit 221 for carrying out soft start for attaining the object of the present invention, an oscillation circuit 23 for generating a triangular wave carrier, a dead time generation circuit 24, a rectangular wave forming circuit 25 for forming rectangular waves from a triangular wave output of the oscillation circuit 23 and outputs VQ7C and VQ8C of the dead time generation circuit 24 respectively, and a switching device driving circuit 26 for generating pulses for turning on/off the switching devices in accordance with outputs of the rectangular wave forming circuit 25.

In such a manner, it is possible to obtain an inverter circuit in which short-circuit of a power supply is prevented from occurring, heat loss hardly occurs in IGBTs, therefore no useless energy is consumed, and noise hardly occurs, and in which soft start can be implemented by a simple circuit added thereto.

(c) of FIG. 14 shows a circuit indicating a full-bridge circuit.

In (c) of FIG. 14, a DC power supply 1 full-wave rectifies commercial power so as to apply a DC voltage VDC to a series-connection circuit of a first semiconductor switching device 61 and a second semiconductor switching device 71 and a series-connection circuit of a third semiconductor switching device 62 and a fourth semiconductor switching device 72. A series-connection circuit of a primary winding 3 of a leakage transformer 2 and a third capacitor 5 is connected between a connection point of the first semiconductor switching device 61 and the second semiconductor switching device 71 and a connection point of the third semiconductor switching device 62 and the fourth semiconductor switching device 72. The third capacitor 5 can be omitted. Control signals from a drive portion 8 are supplied to the bases of the first semiconductor switching device 61, the second semiconductor switching device 71, the third semiconductor switching device 62 and the fourth semiconductor switching device 72, respectively. A dead time generation circuit 24 is incorporated in the drive portion 8. Incidentally, the secondary side of the leakage transformer 2 and a magnetron are not shown.

Then, the lowest frequency limiting circuit for carrying out soft start for attaining the object of the present invention can be also applied to this circuit just in the same manner as in FIG. 5. That is, in FIG. 5, it will go well if there are provided an error signal generation circuit 21 for obtaining a difference between an input current Iin and a reference current Ref based thereon, a frequency-modulated signal generation circuit 22 for generating a frequency-modulated signal from the error signal generation circuit 21 and an AC full-wave signal, a lowest frequency limiting circuit 221 for carrying out soft start for attaining the object of the present invention, an oscillation circuit 23 for generating a triangular wave carrier, a dead time generation circuit 24, a rectangular wave forming circuit 25 for forming rectangular waves from a triangular wave output of the oscillation circuit 23 and outputs VQ7C and VQ8C of the dead time generation circuit 24 respectively, and a switching device driving circuit 26 for generating pulses for turning on/off the switching devices in accordance with outputs of the rectangular wave forming circuit 25.

In such a manner, it is possible to obtain an inverter circuit in which short-circuit of a power supply is prevented from occurring, heat loss hardly occurs in IGBTs, therefore no useless energy is consumed, and noise hardly occurs, and in which soft start can be implemented by a simple circuit added thereto.

Figure 1:
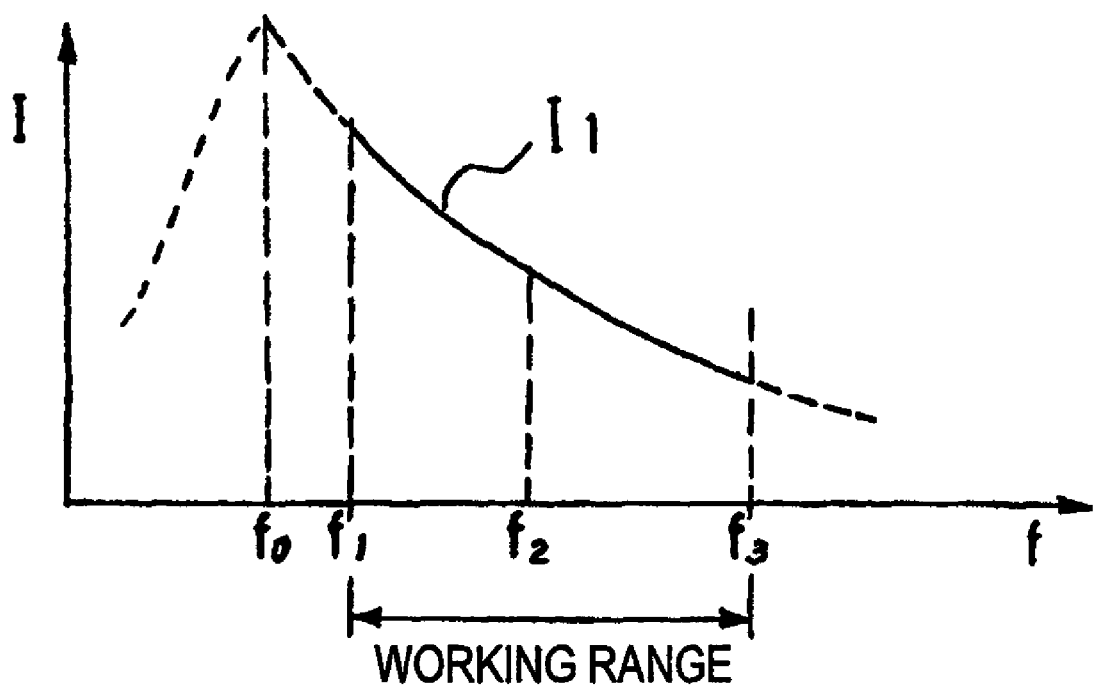
FIG. 1 is a diagram showing a current to working frequency characteristic when a constant voltage is applied to an inverter resonance circuit according to the present invention.
Figure 15:
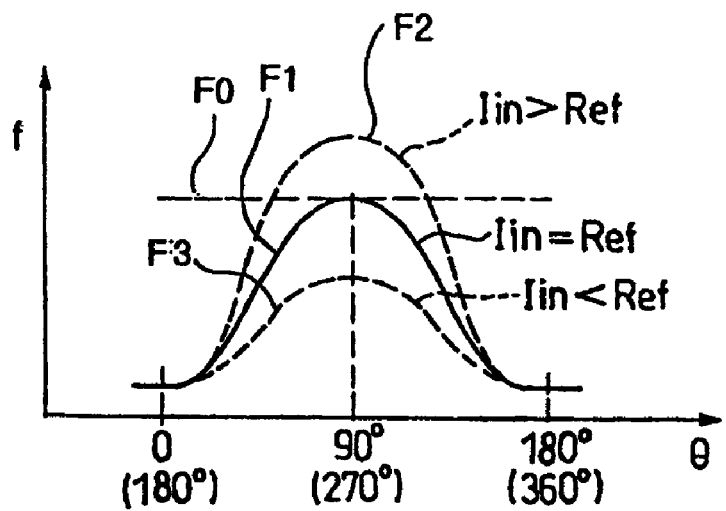
FIG. 15 is a diagram showing the frequency to phase characteristic of an inverter circuit according to the present invention.

FIG. 15 is a diagram showing the frequency to phase characteristic of an inverter circuit according to the present invention. In FIG. 15, the frequency is made smaller near the phase 0 or 180 degrees where the voltage is low, and larger near the phase 90 degrees or 180 degrees. Consequently, near the phase 0 or 180 degrees where the voltage is low, an output current (voltage) is increased according to the current to working frequency characteristic of FIG. 1 because the frequency is made low. On the contrary, near the phase 90 degrees or 270 degrees where the voltage is sufficiently high, the frequency is maximized to narrow the output current (voltage) according to the current to working frequency characteristic of FIG. 1. As a result, the output voltage becomes close to a uniform one over the phase range of from 0 degree to 180 degrees (from 180 degrees to 360 degrees) as shown in FIG. 16.

On the other hand, when the frequency to phase characteristic in FIG. 15 is not changed with respect to the phase at all as shown by a broken line F0 in the diagram, the frequency is high even near the phase 0 or 180 degrees where the voltage is low. Accordingly, the output current (voltage) remains small according to the current to working frequency characteristic of FIG. 1. As a result, a sufficient voltage cannot be obtained near the phase range 0 degree or 180 degrees as shown by the broken line V1 in FIG. 16.

In addition, the solid line F1 is a frequency-phase diagram of an error-free case where an input current Ri (FIG. 5) transferred by a CT from an AC current for producing a DC power supply is equal to the reference current Ref. The solid line F2 is a frequency-phase diagram of a case where the input current Ri is larger than the reference current Ref, and the frequency is increased within the available range in FIG. 1 so as to reduce the current. The solid line F3 is a frequency-phase diagram of a case where the input current Ri is smaller than the reference current Ref, and the frequency is reduced within the available range in FIG. 1 so as to increase the current.

Figure 16:
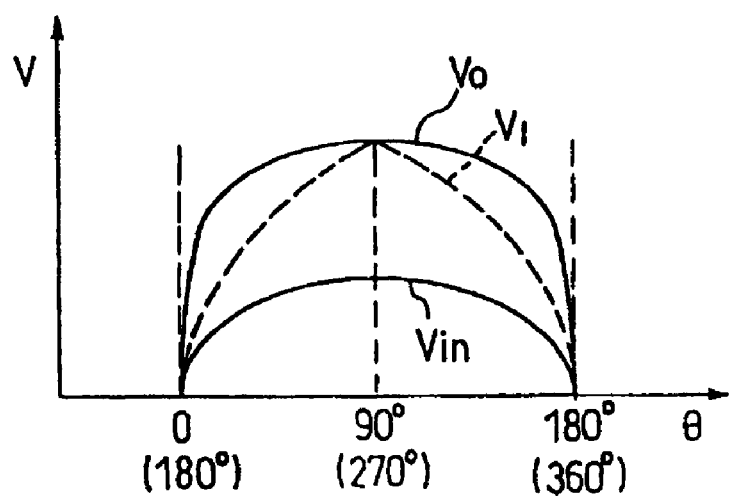
FIG. 16 shows a diagram of the output voltage-to-phase characteristic of the inverter circuit.

In FIG. 16, the solid line Vin designates a voltage waveform of the commercial power supply. The broken line V1 above Vin designates a voltage waveform when switching is performed at a constant frequency all over the phase. The solid line V0 designates a voltage (secondary-side voltage of a boosting transformer) obtained by applying frequency modulation as shown in FIG. 15 to this voltage V1. The voltages Vin, V1 and V0 are illustrated on the same diagram in order to make them easy to see in spite of a large difference in ratio among them. The broken line V1 designates the secondary-side voltage of the boosting transformer at a constant frequency without modulation as shown by the broken line F0 in FIG. 15. This waveform does not match with the load of the magnetron which is nonlinear. On the other hand, when the frequency is reduced near the phase 0 or 180 degrees where the voltage is low and increased near the phase 90 degrees or 180 degrees as shown by the diagram F1 of FIG. 15, the output current (voltage) is increased near the phase 0 or 180 degrees where the voltage is low, while the output current (voltage) is narrowed near the phase 90 degrees or 270 degrees. Thus, as shown by V0 in FIG. 16, a constant voltage is generated on the secondary side of the boosting transformer in any phase over the phase range of from 0 degree to 180 degrees (from 180 degrees to 360 degrees). This waveform matches with the load of the magnetron which is a nonlinear.

Incidentally, this dead time generation circuit is effective in controlling the dead time also when the switching devices (IGBTs) 6 and 7 are put under duty control. For the collector voltages VQ7C and VQ8C can be moved up/down interlocking with each other in order to control the dead time when the center voltage 6V is changed, and the on/off ratio between the two transistors Q8 and Q7 can be changed (duty control) by changing this 6V. That is, the output is the highest when the duty ratio between the two transistors is 50 to 50 (each is operated with 6 V because they are operated by a power supply of 12 V). When the voltage is made lower than 6V or higher than 6V the collector voltages VQ7C and VQ8C of the two transistors can be moved up/down concurrently interlocking with each other, so that the on/off ratio between the two transistors is changed. Thus, the output is reduced. However, even in this case, the offset voltages generated in the resistors R8 and R7 are not changed. Thus, the offset voltages remain constant. Accordingly, it is understood that this circuit is effective in varying the dead time also in the case of duty control.

As has been described above, according to the present invention, a driving unit for driving two semiconductor switching devices for chopping a DC current to thereby output an AC current has a function of limiting the lowest frequency of the frequency with which the semiconductor switching devices are driven. The aforementioned lowest frequency is set to be high at the beginning of the operation of high-frequency heating apparatus. After that, the aforementioned lowest frequency is set to be lower gradually. Specifically, high-frequency heating apparatus includes an error signal generation circuit for generating an error signal from a difference between an input current of an AC commercial power supply and a reference current, and a frequency-modulated signal generation circuit for correcting a rectified voltage/rectified current obtained by rectifying the aforementioned AC power supply, based on the output (error signal) of the aforementioned error signal generation circuit. The output of the aforementioned frequency-modulated signal generation circuit is supplied to a dead time generation circuit. A lowest frequency limiting circuit is inserted between the aforementioned frequency-modulated signal generation circuit and the aforementioned dead time generation circuit. The lowest frequency limiting circuit supplies a limited frequency to the aforementioned dead time generation circuit based on the output signal of the aforementioned frequency-modulated signal generation circuit. The set frequency of the lowest frequency limiting circuit is set to be higher than the output of the aforementioned frequency-modulated signal generation circuit at the beginning of operation of the aforementioned high-frequency heating apparatus. In accordance with the time having passed since the beginning of operation, the aforementioned limited frequency is lowered gradually. With the lowering of the aforementioned limited frequency, a signal higher in switching frequency of the aforementioned limited frequency and the output signal of the aforementioned frequency-modulated signal generation circuit is selected as the signal to be supplied to the aforementioned dead time generation circuit in accordance with the time having passed. Thus, the selected signal is changed over gradually to the output signal of the aforementioned frequency-modulated signal generation circuit. In addition, the aforementioned lowest frequency limiting circuit has a capacitor. The aforementioned capacitor is charged during suspension of the aforementioned high-frequency heating apparatus. As soon as the aforementioned high-frequency heating apparatus begins to operate, the voltage of the capacitor is supplied to the aforementioned dead time generation circuit, and charges accumulated in the capacitor are discharged. Thus, it is possible to obtain an inverter circuit in which heat loss hardly occurs in IGBTs, therefore no useless energy is consumed, and noise hardly occurs, and in which soft start can be implemented by a simple circuit.

Although the present invention has been described in detail and with reference to its specific embodiments, it is obvious for those skilled in the art that various changes or modifications can be made on the present invention without departing from its spirit and scope.

The present application is based on Japanese Patent Application No. 2004-113272 filed on Apr. 7, 2004, whose contents are incorporated herein for reference.

INDUSTRIAL APPLICABILITY

According to high-frequency heating apparatus according to the present invention, it is possible to obtain an inverter circuit in which short-circuit of a power supply is prevented from occurring, heat loss hardly occurs in IGBTs, therefore no useless energy is consumed, and noise hardly occurs, and in which soft start can be implemented by a simple circuit added thereto.

The invention claimed is:

1. A high-frequency heating apparatus for driving a magnetron, comprising:

a DC power supply including an AC power supply, a rectifier circuit for rectifying a voltage of the AC power supply, and a smoothing capacitor for smoothing an output voltage of the rectifier circuit;

a series circuit including two semiconductor switching devices, the series circuit being connected in parallel to the DC power supply;

a resonance circuit having a primary winding of a leakage transformer and a capacitor, which are connected to each other, one end of the resonance circuit being connected to a middle point of the series circuit while the other end of the resonance circuit is connected to one end of the DC power supply;

a drive unit for driving each of the semiconductor switching devices alternatively or drives the semiconductor switching devices so as to provide a period in which the semiconductor switching devices are turned off concurrently;

a rectifier unit connected to a secondary winding of the leakage transformer;

a magnetron connected to the rectifier unit;

a dead time generation circuit that generates a dead time control signal for turning off the semiconductor switching devices concurrently;

an error signal generation circuit generating an error signal based on a difference between an input current of the AC power supply and the reference current; and a frequency-modulated signal generation circuit that outputs to the dead time generation circuit a frequency-modulated signal obtained by controlling an amplitude of a rectified voltage signal output from the DC power supply based on the error signal, wherein the drive unit limits the lowest frequency of a frequency with which the semiconductor switching devices are driven, so that the lowest frequency is set to be high at the beginning of operation of the high frequency heating apparatus, and the lowest frequency is set to be lower gradually thereafter.

2. The high-frequency heating apparatus according to claim 1, further comprising:

another series circuit including two semiconductor devices, wherein each of the series circuit and the another series circuit being connected in parallel to the DC power supply, wherein the other end of the resonance circuit is connected to the one end of the DC power supply through a middle point of the another series circuit; and wherein the drive unit drives the semiconductor switching devices of the another series circuit alternatively or drives the semiconductor switching devices of the another series circuit so as to provide a period in which the semiconductor switching devices of the another series circuit are turned off concurrently.

3. The high-frequency heating apparatus according to claim 1, wherein the dead time generation circuit generates a fixed or marginally increased dead time regardless of a switching frequency.

4. The high-frequency heating apparatus according to claim 1, wherein the dead time generation circuit generates a dead time increased in accordance with increase of a switching frequency.

5. The high-frequency heating apparatus according to claim 4, wherein the dead time generation circuit fixes or marginally increases the dead time at a switching frequency not higher than a predetermined frequency.

6. The high-frequency heating apparatus according to claim 4, wherein the dead time generation circuit suddenly increases the dead time at a switching frequency not lower than a predetermined frequency.

7. The high-frequency heating apparatus according to claim 1, wherein the dead time generation circuit generates a dead time based on positive and negative offset voltages each varying with a first inclination in proportion to increase of a switching frequency and varying with a second inclination when the switching frequency reaches a predetermined frequency or higher.

8. The high-frequency heating apparatus according to claim 1, wherein the dead time generation circuit includes a VCC power supply, a duty control power supply, a first current varying in proportion to a switching frequency, a second current flowing at a predetermined frequency at beginning and varying in proportion to the switching frequency, a third current obtaining by and multiplying a combining current of the two currents by a predetermined coefficient, and a upper and lower potential generation unit for generating a set of upper and lower potentials obtained by adding positive and negative offset voltages proportional to the third current, to the duty control power supply respectively, and a dead time is generated based on the set of upper and lower potentials.

9. The high-frequency heating apparatus according to claim 2, wherein the lowest frequency limiting circuit has a capacitor, the capacitor is charged during suspension of the high-frequency heating apparatus, and as soon as the high-frequency heating apparatus begins to operate, a voltage of the capacitor is supplied to the dead time generation circuit, and charges accumulated in the capacitor are discharged.

10. The high-frequency heating apparatus according to claim 1, further comprising:
   another series circuit including two capacitors, the series circuit and the another series circuit being connected in parallel to the DC power supply,
   wherein the other end of the resonance circuit is connected to the one end of the DC power supply through a middle point of the another series circuit.

11. The high-frequency heating apparatus according to claim 1, wherein:
   the frequency-modulated signal generation circuit corrects the rectified voltage obtained by rectifying the AC power supply, based on the error signal from the error signal generation circuit, the high-frequency heating apparatus further comprising:
   a lowest frequency limiting circuit inserted between the frequency-modulated signal generation circuit and the dead time generation circuit, wherein the lowest frequency limiting circuit supplies a limited frequency to the dead time generation circuit based on the output signal of the frequency-modulated signal generation circuit so that a set frequency of the lowest frequency limiting circuit is set to be higher than the output of the frequency-modulated signal generation circuit at the beginning of operation of the aforementioned high-frequency heating apparatus, and in accordance with time having passed since the beginning of operation, the limited frequency is lowered gradually, while with lowering of the limited frequency, a signal higher in switching frequency of the limited frequency and the output signal of the frequency-modulated signal generation circuit is selected as a signal to be supplied to the dead time generation circuit in accordance with time having passed, so that the selected signal is changed over gradually to the output signal of the frequency-modulated signal generation circuit.

12. The high-frequency heating apparatus according to claim 5, wherein a fixed or marginally increased value of the dead time at a switching frequency not higher than a predetermined frequency or a suddenly increased value of the dead time at a switching frequency not lower than a predetermined frequency is variable.

13. The high-frequency heating apparatus according to claim 5, wherein a value of the predetermined switching frequency is variable.

14. The high-frequency heating apparatus according to claim 1, wherein the dead time generation circuit increases a dead time stepwise with increase of a switching frequency.

15. The high-frequency heating apparatus according to claim 8, wherein input power or input current control is performed by changing at least one of a voltage of the duty control power supply and the switching frequency.

* * * * *